(12) United States Patent
Imai et al.

(10) Patent No.: US 10,890,810 B2
(45) Date of Patent: Jan. 12, 2021

(54) DISPLAY DEVICE AND HEAD-MOUNTED DISPLAY

(71) Applicant: SHARP KABUSHIKI KAISHA, Sakai (JP)

(72) Inventors: Masahiro Imai, Sakai (JP); Yoshihiko Katsuda, Sakai (JP); Noriyuki Nakane, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 153 days.

(21) Appl. No.: 16/313,163

(22) PCT Filed: Jun. 27, 2017

(86) PCT No.: PCT/JP2017/023476
§ 371 (c)(1),
(2) Date: Dec. 26, 2018

(87) PCT Pub. No.: WO2018/008454
PCT Pub. Date: Jan. 11, 2018

(65) Prior Publication Data
US 2020/0310184 A1    Oct. 1, 2020

(30) Foreign Application Priority Data
Jul. 4, 2016 (JP) .................................. 2016-132335

(51) Int. Cl.
*G02F 1/1339* (2006.01)
*G02F 1/1335* (2006.01)

(52) U.S. Cl.
CPC .... *G02F 1/13394* (2013.01); *G02F 1/133512* (2013.01); *G02F 1/133514* (2013.01)

(58) Field of Classification Search
CPC ............... G02F 1/13394; G02F 1/1339; G02F 1/133512; G02F 1/133514; G02B 27/0172; G02B 27/017
See application file for complete search history.

(56) References Cited

U.S. PATENT DOCUMENTS

2012/0327338 A1* 12/2012 Kobayashi ............ G02F 1/1337
349/106
2013/0342795 A1* 12/2013 Park .................. G02F 1/134336
349/110

(Continued)

FOREIGN PATENT DOCUMENTS

CN        104656318 A     5/2015
JP        H07-302063 A    11/1995
(Continued)

*Primary Examiner* — Jia X Pan
(74) *Attorney, Agent, or Firm* — ScienBiziP, P.C.

(57) ABSTRACT

A display device includes substrates, pixels, an inter-pixel light blocking portion, a spacer, a spacer non-arranged portion, and a spacer arranged portion. The pixels are arranged in each of a first direction and a second direction perpendicular to each other. The inter-pixel light blocking portion includes at least one first partition portion partitioning the pixels arranged in the first direction and at least one second partition portion partitioning the pixels arranged in the second direction. The spacer is disposed between the substrates. The spacer non-arranged portion in which the spacer is not arranged is included in the first partition portion. The spacer arranged portion in which the spacer is arranged is included in the first partition portion. The spacer arranged portion wider than the spacer non-arranged portion has a formation area straddling the second partition portion with respect to the second direction.

8 Claims, 21 Drawing Sheets

(56) References Cited

U.S. PATENT DOCUMENTS

| | | | |
|---|---|---|---|
| 2015/0198807 A1* | 7/2015 | Hirai | G02B 27/017 345/8 |
| 2015/0261050 A1* | 9/2015 | Chen | G02F 1/133514 349/42 |
| 2016/0103352 A1* | 4/2016 | Sugiyama | G02F 1/13394 349/123 |
| 2016/0187717 A1* | 6/2016 | Hosokawa | G02F 1/13394 349/110 |
| 2016/0266443 A1 | 9/2016 | Pang et al. | |
| 2017/0184900 A1* | 6/2017 | Jang | G02F 1/136227 |
| 2017/0345391 A1* | 11/2017 | Usui | G09G 3/001 |
| 2018/0039120 A1 | 2/2018 | Saitoh et al. | |

FOREIGN PATENT DOCUMENTS

| | | |
|---|---|---|
| JP | 2011-209618 A | 10/2011 |
| JP | 2013-033096 A | 2/2013 |
| JP | 2014-013320 A | 1/2014 |
| WO | 2016/143674 A1 | 9/2016 |

* cited by examiner

FIG.12

| | dpi | PIXEL TO PIXEL PITCH [μm] | LENGTH DIMENSION OF SPACER [μm] | SPACER DENSITY [%] | OPENING RATIO [%] | RATE OF INCREASE IN OPENING RATIO [%] |
|---|---|---|---|---|---|---|
| COMPARATIVE EXAMPLE 1 | 564 | 45 | 24 | 4.4 | 60.3 | — |
| COMPARATIVE EXAMPLE 2 | | | 15 | 2.8 | | |
| EXAMPLE 1 | | | 24 | 2.8 | 63.1 | 5 |

FIG.15

| | dpi | PIXEL TO PIXEL PITCH [μm] | LENGTH DIMENSION OF SPACER [μm] | SPACER DENSITY [%] | OPENING RATIO [%] | RATE OF INCREASE IN OPENING RATIO [%] |
|---|---|---|---|---|---|---|
| COMPARATIVE EXAMPLE 1 | 564 | 45 | 24 | 4.4 | 60.3 | — |
| COMPARATIVE EXAMPLE 2 | | | 15 | 2.8 | 63.1 | 5 |
| EXAMPLE 1 | 1058 | 24 | 24 | 2.8 | 33.3 | — |
| COMPARATIVE EXAMPLE 3 | | | 10 | 6.5 | 38.8 | 17 |
| EXAMPLE 2 | | | | 2.7 | | |

FIG.18

| | dpi | PIXEL TO PIXEL PITCH [μm] | LENGTH DIMENSION OF SPACER [μm] | SPACER DENSITY [%] | OPENING RATIO [%] | RATE OF INCREASE IN OPENING RATIO [%] |
|---|---|---|---|---|---|---|
| COMPARATIVE EXAMPLE 1 | 564 | 45 | 24 | 4.4 | 60.3 | — |
| COMPARATIVE EXAMPLE 2 | | | 15 | 2.8 | | — |
| EXAMPLE 1 | | | 24 | 2.8 | 63.1 | 5 |
| COMPARATIVE EXAMPLE 3 | 1058 | 24 | 10 | 6.5 | 33.3 | — |
| EXAMPLE 2 | | | | 2.7 | 38.8 | 17 |
| COMPARATIVE EXAMPLE 4 | 1588 | 16 | 10 | 9.8 | 12.5 | — |
| EXAMPLE 3 | | | | 2.8 | 17.4 | 39 |

FIG.21

| | dpi | PIXEL TO PIXEL PITCH [μm] | LENGTH DIMENSION OF SPACER [μm] | SPACER DENSITY [%] | OPENING RATIO [%] | RATE OF INCREASE IN OPENING RATIO [%] |
|---|---|---|---|---|---|---|
| COMPARATIVE EXAMPLE 1 | 564 | 45 | 24 | 4.4 | 60.3 | — |
| COMPARATIVE EXAMPLE 2 | | | 15 | 2.8 | 63.1 | 5 |
| EXAMPLE 1 | 1058 | 24 | 24 | 2.8 | 33.3 | — |
| COMPARATIVE EXAMPLE 3 | | | 10 | 6.5 | 38.8 | 17 |
| EXAMPLE 2 | 1588 | 16 | 10 | 2.7 | 12.5 | — |
| COMPARATIVE EXAMPLE 4 | | | 14 | 9.8 | 17.4 | 39 |
| EXAMPLE 3 | 1693 | 15 | 10 | 2.8 | 9.3 | — |
| COMPARATIVE EXAMPLE 5 | | | 10 | 11.7 | | |
| COMPARATIVE EXAMPLE 6 | | | | 8.3 | 13.7 | 47 |
| EXAMPLE 4 | | | 14 | 2.9 | | |

DISPLAY DEVICE AND HEAD-MOUNTED DISPLAY

TECHNICAL FIELD

The present invention relates to a display device and a head-mounted display.

BACKGROUND ART

A conventional example of a liquid crystal display device is disclosed in Patent Document 1. The liquid crystal display device disclosed in Patent Document 1 includes: a transparent substrate; light blocking portions formed on the transparent substrate; pixels which are formed in opening portions defined by the light blocking portions, and which include colored layers of colors for pixels; and laminated spacers which are formed on the transparent substrate or the light blocking portions, and in which colored layers of colors for spacers are laminated. The colored layer of at least one color for pixels has the chromaticity thereof adjusted through a chromaticity adjustment process.

RELATED ART DOCUMENT

Patent Document

Patent Document 1: Japanese Unexamined Patent Application Publication No. 2011-209618

Problem to be Solved by the Invention

In the liquid crystal display device disclosed in Patent Document 1, the laminated spacers installed on the light blocking portions are separately arranged on a pixel by pixel basis. However, as resolution becomes higher and pixels become correspondingly smaller with a corresponding decrease in the width of the light blocking portions, the laminated spacers installed on the light blocking portions also become smaller. As the laminated spacers become smaller, it may become impossible to obtain a sufficient mechanical strength, or production may become difficult. If, in order to avoid such problems, an arrangement is adopted in which, for example, the laminated spacers are located inside the pixels, the amount of light transmitted through the pixels may be decreased due to the laminated spacers present in the pixels. As a result, the effective opening ratios of the pixels may be decreased, or uneven brightness may be caused.

DISCLOSURE OF THE PRESENT INVENTION

The present invention has been made in view of the above circumstances. An object of the present invention is to achieve an increase in resolution.

Means for Solving the Problem

A display device according to the present invention includes a pair of substrates bonded to each other; pixels arranged in each of a first direction and a second direction perpendicular to each other in a plane of the substrates; an inter-pixel light blocking portion which includes at least one first partition portion partitioning the pixels arranged in the first direction, and at least one second partition portion partitioning the pixels arranged in the second direction, and which blocks light between adjacent pixels; a spacer disposed between the pair of substrates; a spacer non-arranged portion which is included in the first partition portion and in which the spacer is not arranged; and a spacer arranged portion which is included in the first partition portion and in which the spacer is arranged. The spacer arranged portion has a formation area straddling the second partition portion with respect to the second direction, and is wider than the spacer non-arranged portion.

In this way, the pixels arranged in each of the first direction and the second direction perpendicular to each other in the plane of the substrates are partitioned, with respect to the first direction and the second direction, by the first partition portion and the second partition portion configuring the inter-pixel light blocking portion, whereby light is blocked between the adjacent pixels. The spacer is disposed between the pair of substrates bonded to each other, whereby an interval between the pair of substrates is kept. The first partition portion of the inter-pixel light blocking portion includes the spacer non-arranged portion in which the spacer is not arranged and a spacer arranged portion having the spacer arranged therein. The spacer arranged portion has the formation area straddling the second partition portion with respect to the second direction and is wider than the spacer non-arranged portion. Accordingly, even when the pixels are reduced in size, it is possible to ensure a sufficient formation area for the spacer with respect to the first direction and the second direction. Thus, a sufficient mechanical strength of the spacer can be obtained, and the spacer can be sized to make production easy (not difficult). In addition, the spacer non-arranged portion is made narrower in width than the spacer arranged portion. Accordingly, it is possible to suppress a decrease in the opening ratios of the pixels due to an increase in the formation area for the spacer. Thus, an increase in resolution can be achieved in a preferable manner.

Preferable embodiments of the present invention may include the following configurations.

(1) The at least one first partition portion in the inter-pixel blocking portion may include first partition portions The at least one second partition portion in the inter-pixel blocking portion may include second partition portions. The display device may further include three or more spacer arranged portions disposed at positions sandwiching the pixels with respect to each of the first direction and the second direction. In this way, three or more spacers are two-dimensionally arranged in a dispersed manner in the inter-pixel light blocking portion. Accordingly, visual recognition of the spacer arranged portions having the spacers arranged therein is made difficult.

(2) The spacer arranged portions may be periodically disposed at positions sandwiching a certain number of the pixels with respect to each of the first direction and the second direction so as to configure a spacer arrangement pattern. In this way, the spacers are arranged with a two-dimensional periodicity in the inter-pixel light blocking portion. Accordingly, the interval between the pair of substrates can be more stably kept by the spacers, and visual recognition of the spacer arranged portion is made difficult.

(3) The display device may further include spacer arrangement patterns such that the respective spacer arranged portions are displaced with respect to the first direction. Thus, the spacer arranged portions configuring the spacer arrangement patterns are displaced with respect to the first direction. Accordingly, the interval between the pair of substrates can be more stably kept by the spacers, and visual recognition of the spacer arranged portions becomes more difficult.

(4) The pixels may include pixels which are arranged in at least one of the first direction and the second direction, and which produce mutually different colors, the pixels configuring a single display pixel which produces white color. The spacer arranged portions may be disposed at positions sandwiching the same number of the display pixels with respect to each of the first direction and the second direction. In this way, the number of display pixels disposed between the adjacent spacers becomes the same with respect to the first direction and the second direction. Accordingly, the interval between the pair of substrates can be more stably kept by the spacers, and visual recognition of the spacer arranged portions becomes difficult.

(5) The spacer arranged portion may have a dimension with respect to the first direction which is smaller than a size corresponding to the sum of a dimension of the pixels with respect to the first direction, and a dimension with respect to the first direction of a pair of the first partition portions sandwiching the pixels with respect to the first direction. When the resolution of the display device is not so high, the pair of substrates can be kept with each other stably even with the spacers being sized as described above.

(6) Among the pixels, the pixel which is adjacent with respect to the second direction to the spacer arranged portion having the spacer arranged therein may be displaced by an amount with respect to the first direction from the pixel which is adjacent thereto with respect to the second direction and which is adjacent to the spacer arranged portion with respect to the first direction. The amount of displacement may be a difference in width between the spacer arranged portion and the spacer non-arranged portion. In this way, the pixel adjacent to the spacer arranged portion with respect to the second direction has the same dimension with respect to the first direction as the pixel which is adjacent to that pixel with respect to the second direction and which is adjacent to the spacer arranged portion with respect to the first direction. Accordingly, a difference in opening ratio becomes less likely to be caused between the pixels, and an increase in resolution can be achieved in a more preferable manner.

(7) The spacer arranged portion may have a dimension with respect to the first direction which is equal to or greater than a size corresponding to the sum of a dimension of the pixels with respect to the first direction and a dimension with respect to the first direction of a pair of the first partition portions sandwiching the pixels with respect to the first direction. When the resolution of the display device is increased, the pair of substrates can be kept with each other stably by the spacer being sized as described above.

(8) The spacer arranged portion may have a dimension with respect to the first direction which is the same as the size corresponding to the sum of the dimension of the pixels with respect to the first direction and the dimension with respect to the first direction of the pair of the first partition portions sandwiching the pixels with respect to the first direction. In this way, the pixels adjacent to each other with respect to the second direction are linearly arrayed without being displaced with respect to the first direction. In this way, the opening ratios of the pixels can be made uniform and the wires and the like for driving the pixels can be arranged in a preferable manner.

(9) The dimension of the spacer arranged portion with respect to the first direction may be greater than the size corresponding to the sum of the dimension of the pixels with respect to the first direction and the dimension with respect to the first direction of the pair of the first partition portions sandwiching the pixels with respect to the first direction. Among the pixels, the pixels which are adjacent with respect to the second direction to the spacer arranged portion having the spacer arranged therein may be displaced by an amount with respect to the first direction from the pixels which are adjacent thereto with respect to the second direction and which are adjacent with respect to the first direction to the spacer arranged portion. The amount or displacement may be a difference between the dimension of the spacer arranged portion with respect to the first direction and the size corresponding to the sum of the dimension of the pixels with respect to the first direction and the dimension with respect to the first direction of the pair of the first partition portions sandwiching the pixels with respect to the first direction. In this way, the pixel adjacent to the spacer arranged portion with respect to the second direction and the pixel which is adjacent to that pixel with respect to the second direction and which is adjacent to the spacer arranged portion with respect to the first direction have the same dimension with respect to the first direction. Accordingly, a difference in opening ratio becomes less likely to be caused between the pixels, and an increase in resolution can be achieved in a more preferable manner.

(10) The spacer arranged portion may have a dimension with respect to the second direction which is the same as a size corresponding to the sum of "N" times a dimension of the pixels with respect to the second direction and "N+1" times a dimension of the second partition portion with respect to the second direction. In this way, the pixels sandwiching the spacer arranged portion from both sides with respect to the second direction are arrayed linearly in the first direction without being displaced with respect to the second direction from the pixels that are adjacent with respect to the first direction. Accordingly, the opening ratios of the pixels can be made uniform in a preferable manner. In the foregoing, "N" is a natural number of two or more and is equal to a number obtained by adding one to the number of the second partition portions that the spacer arranged portion straddles with respect to the second direction.

In order to solve the problem, a head-mounted display according to the present invention includes at least the display device; a lens portion imaging an image displayed on the display device onto an eye of a user; and a head-mounted unit which includes the display device and the lens portion and which is worn on a head of the user, with the head-mounted display having the above configuration, when the head-mounted unit is used by being worn on the head of the user, the image being displayed on the display device is imaged by the lens portion onto the eye of the user, and the user can view the image being displayed on the display device in magnified form. In such uses where an image being displayed on the display device is viewed by the user in magnified form, the display device tends to be required to provide higher levels of resolution. In this respect, since the display device is adapted for achieving high resolution, a sufficiently high display quality can be obtained.

Advantageous Effect of the Invention

According to the present invention, an increase in resolution can be achieved.

BRIEF DESCRIPTION OF THE DRAWINGS

FIG. 12 is a table showing the experimental results of the first comparative experiment.

FIG. 15 is a table showing the experimental results of the second comparative experiment.

FIG. 18 is a table showing the experimental results of the third comparative experiment.

FIG. 21 is a table showing the experimental results of the fourth comparative experiment.

MODE FOR CARRYING OUT THE INVENTION

First Embodiment

Figure 1:
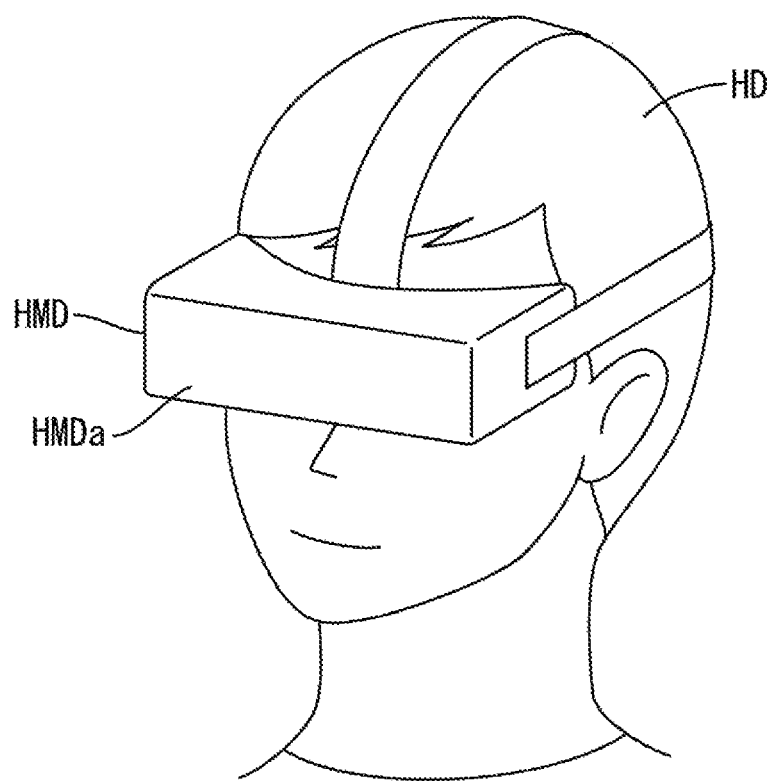
FIG. 1 is a schematic perspective view illustrating a state in which a user has a head-mounted display according to the first embodiment of the present invention worn on the head.

A first embodiment of the present invention will be described with reference to FIG. 1 to FIG. 6. In the present embodiment, a goggle-type head-mounted display (HMD) HMD and a liquid crystal panel (display device) 10 used therein will be described by way of example. Some of the drawings show the X-axis, the Y-axis, and the Z-axis, the directions of the respective axes corresponding to the directions indicated in the drawings. The Y-axis direction corresponds to a first direction, and the X-axis direction corresponds to a second direction.

Figure 2:
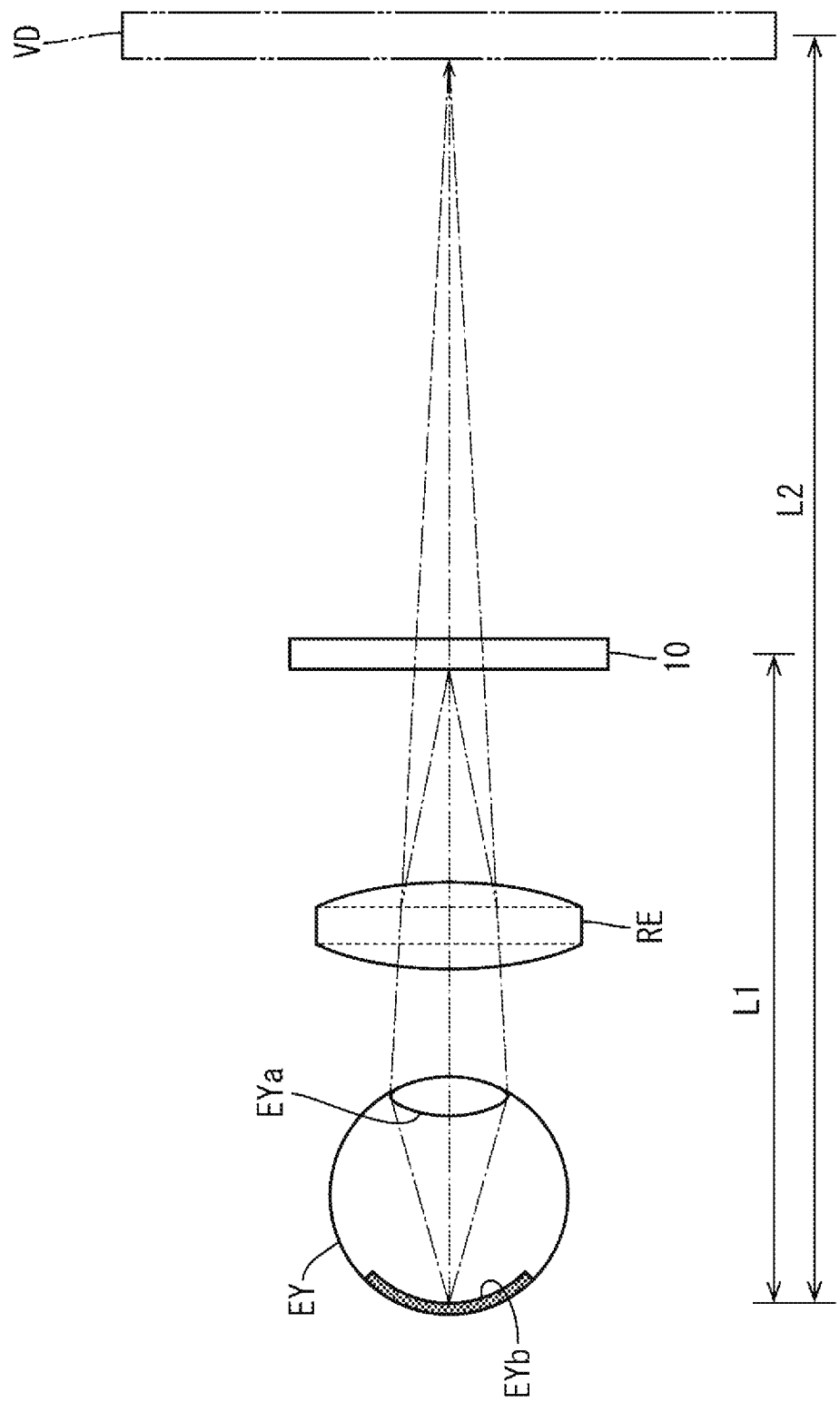
FIG. 2 is a schematic side view illustrating the optical relationship between the eyeball of the user and a liquid crystal panel and a lens portion which are provided in a head-mounted unit configuring the head-mounted display.

As illustrated in FIG. 1, the goggle-type head-mounted display HMD is provided with a head-mounted unit HMDa which is worn on the head HD of a user so as to enclose both eyes. As illustrated in FIG. 2, the head-mounted unit HMDa incorporates at least a liquid crystal panel 10 for displaying an image, and a lens portion RE for imaging the image displayed on the liquid crystal panel 10 onto the eyeball (eye) EY of the user. The liquid crystal panel 10 displays an image using light irradiated from an external light source, not illustrated. The lens portion RE is disposed between the liquid crystal panel 10 and the eyeball EY of the user, and imparts a refractive action to transmitted light. By adjusting the focal point distance of the lens portion re, it becomes possible to make the user recognize as if an image being imaged onto the retina (eye) EYb through the crystalline lens EYa of the eyeball EY were being displayed on a virtual display VD that apparently exists at the position of a distance L2 which is far longer than an actual distance L1 from the eyeball EY to the liquid crystal panel 10. In this way, the user sees a magnified image (virtual image) being displayed on the virtual display VD, which has a screen size (such as on the order of tens of inches to hundreds of inches) far greater than the screen size (such as on the order of fractions of an inch to a few inches) of the liquid crystal panel 10. It is possible to mount a single liquid crystal panel 10 on the head-mounted unit HMDa, and to cause the liquid crystal panel 10 to display a right-eye image and a left-eye image. It is also possible to mount two liquid crystal panels 10 on the head-mounted unit HMDa, and to cause one liquid crystal panel 10 to display a right-eye image and the other liquid crystal panel 10 to display a left-eye image. The head-mounted unit HMDa is equipped with the external light source and also earphones and the like, not illustrated, which are attached to the ears of the user and emit sound.

Figure 6:
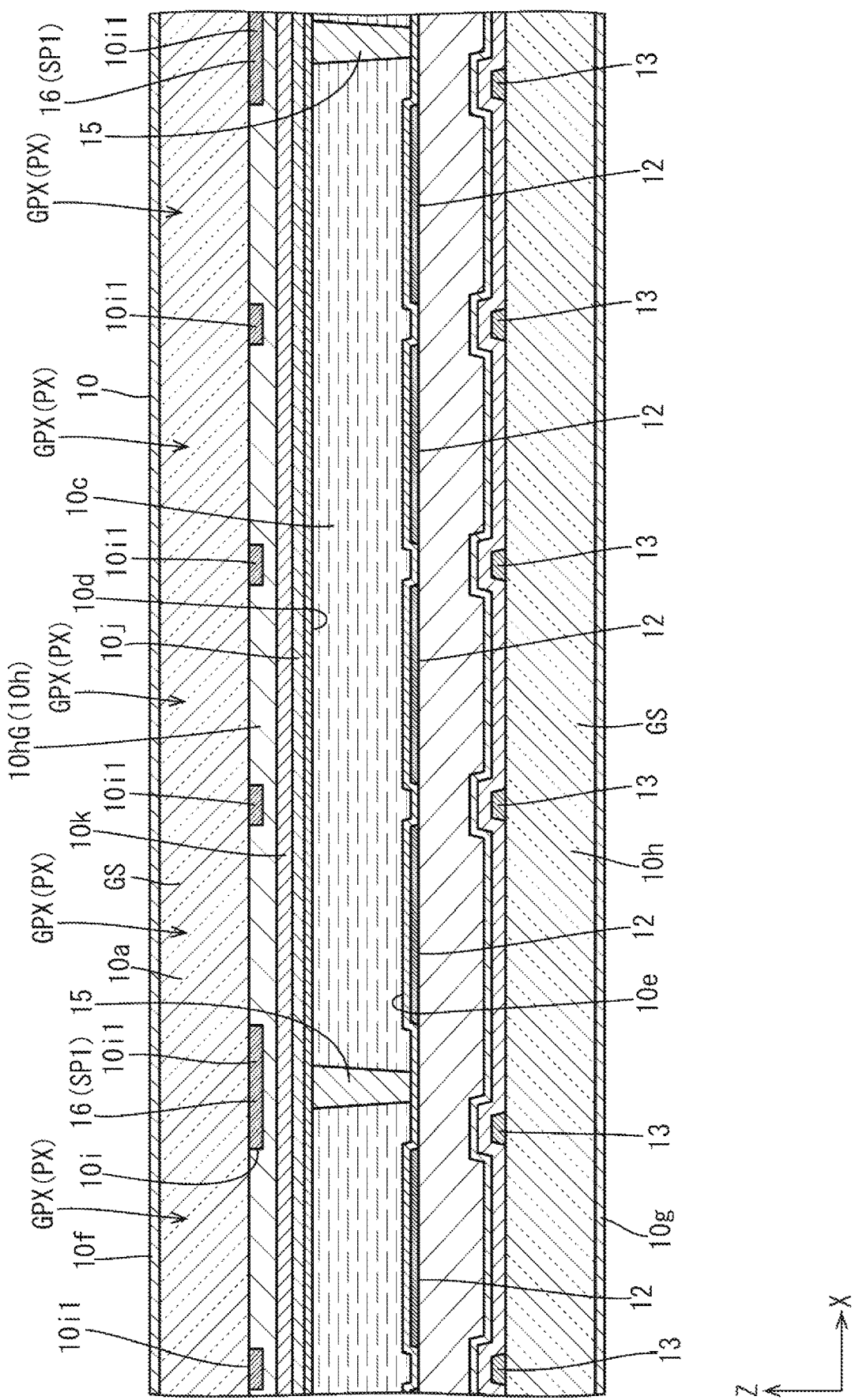
FIG. 6 is a cross sectional view taken along line A-A of FIG. 5.

The configuration of the liquid crystal panel 10 will be described. As illustrated in FIG. 6, the liquid crystal panel 10 is provided with: a pair of transparent (highly optically transmissive) substrates 10a, 10b; and a liquid crystal layer 10c which is disposed between the substrates 10a, 10b and which includes liquid crystal molecules that are a material of which the optical characteristics vary when an electric field is applied thereto. The substrates 10a, 10b are bonded to each other using a sealant which is not illustrated, with a cell gap corresponding to the thickness of the liquid crystal layer 10c maintained therebetween. The substrates 10a, 10b are each provided with a substantially transparent glass substrate GS. On the glass substrate GS, films are laminated by a known photolithography method and the like. One of the substrates 10a, 10b that is on the upper side (front surface side) is a CF substrate (second substrate, counter substrate) 10a. The other on the lower side (rear surface side) is an array substrate (first substrate, thin film transistor substrate, active matrix substrate) 10b. On the outer surface of the substrates 10a, 10b, polarizing plates 10f, 10g are affixed, respectively. On the inner surface side of the substrates 10a, 10b, alignment films 10d, 10e are formed, respectively, to align the liquid crystal molecules included in the liquid crystal layer 10c.

Figure 3:
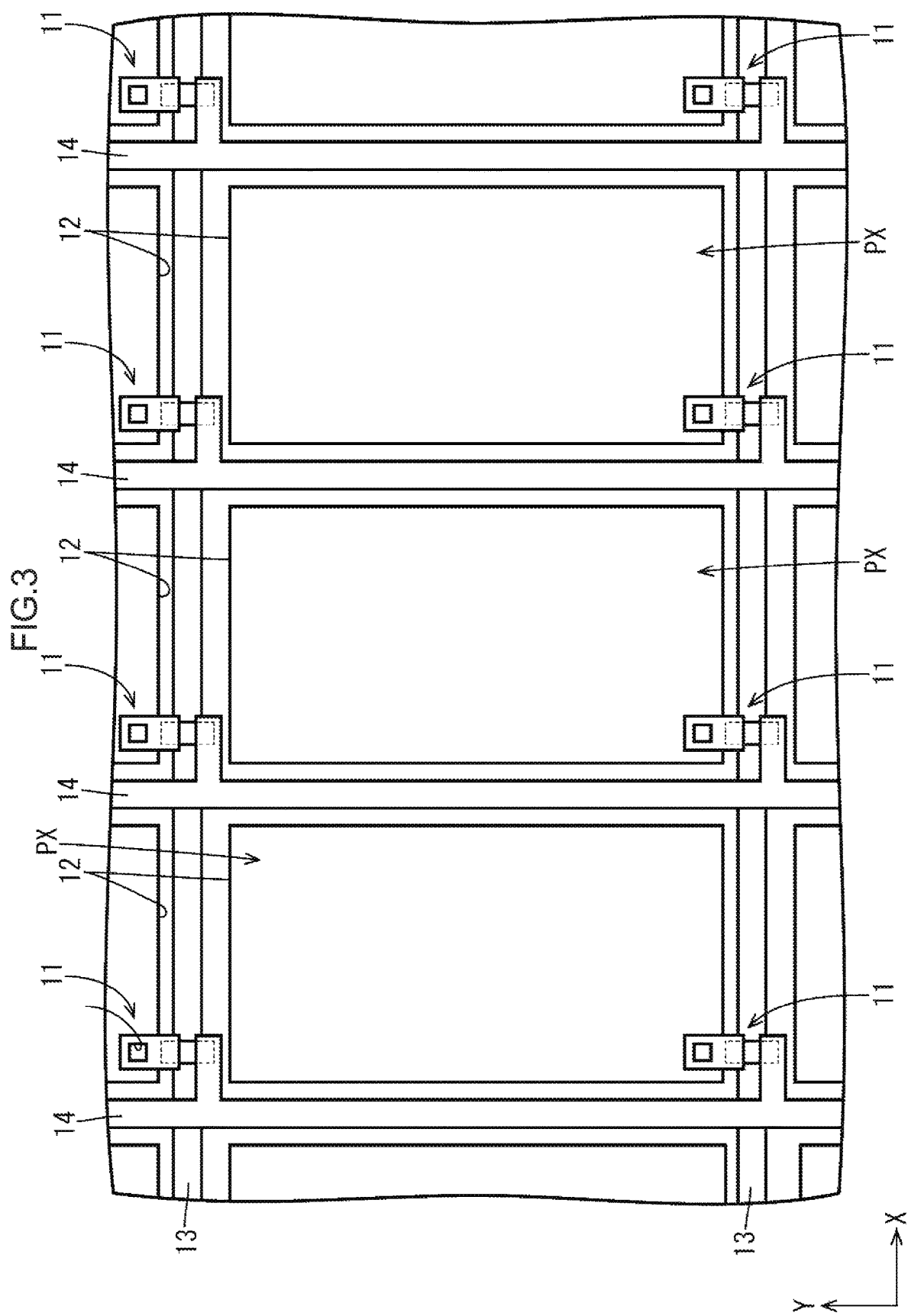
FIG. 3 is a plan view illustrating display pixels on an array substrate configuring the liquid crystal panel.

As illustrated in FIG. 3, on the inner surface side (the liquid crystal layer 10c side; the side opposing the CF substrate 10a) of the array substrate 10b in a display region at the center of a screen in which an image is displayed, a large number of thin film transistors (TFT) 11 which are switching elements and a large number of pixel electrodes 12 are respectively arranged in a matrix. The TFTs 11 and the pixel electrodes 12 are surrounded by a large number of gate wires (first wire) 13 extending in the X-axis direction, and by a large number of source wires (second wire) 14 extending in the Y-axis direction. In other words, the TFTs 11 and the pixel electrodes 12 are arranged in rows and columns at the intersections of the gate wires 13 and the source wires 14 forming a substantially lattice-shape. The pixel electrodes 12, when viewed in plan, have a longitudinal quadrangular (rectangular) shape filling the regions surrounded by the gate wires 13 and the source wires 14. The pixel electrodes 12 are configured to be charged with predetermined potentials (specifically, potentials based on signals supplied onto the source wires 14) by the TFTs 11. The array substrate 10b may be provided with an auxiliary capacitive wire (not illustrated) extending along the gate wires 13 and across the pixel electrodes 12.

Figure 4:
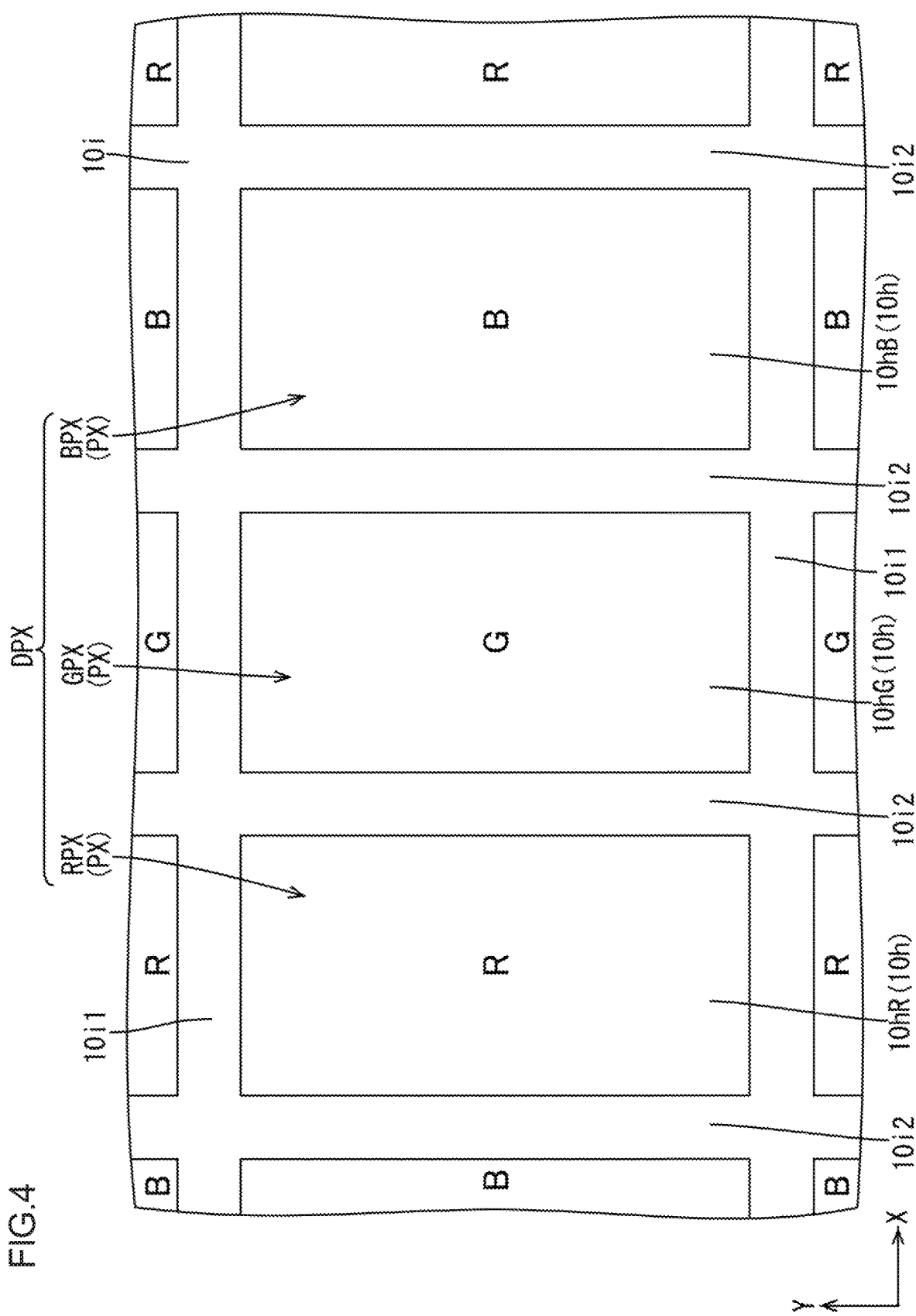
FIG. 4 is a plan view illustrating the display pixels on a CF substrate configuring the liquid crystal panel.

As illustrated in FIG. 4, on the inner surface side (the liquid crystal layer 10c side; the side opposing the array substrate 10b) of the CF substrate 10a in the display region, color filters (colored portion) 10h having three colors of red (R), green (G), and blue (B) are provided. In the following, when the color filters 10h are to be distinguished, the symbol for red will be suffixed with "R", the symbol for green will be suffixed with "G", and the symbol for blue will be suffixed with "B". When collectively referred to and not to be distinguished, no suffix will be given to the symbol. A large number of the color filters 10h are arrayed in each of the Y-axis direction (first direction, column direction) and the X-axis direction (second direction, row direction) perpendicular to each other, forming the shape of rows and columns (matrix shape). The color filters 10h that are adjacent to each other with respect to the X-axis direction have mutually different colors. The color filters 10h adjacent to each other with respect to the Y-axis direction have the same color. The color filters 10h arranged in large numbers in rows and columns are arranged so as to respectively overlap, when viewed in plan, the pixel electrodes 12 on the array substrate 10b side. The pixel electrodes 12 overlapping each other and the color filter 10h form the single pixels PX. The pixels PX include three colors of pixels of a red pixel RPX having a red color filter 10hR, a green pixel GPX having a green color filter 10hG, and a blue pixel BPX having a blue color filter 10hB. The three colors of the (three) pixels RPX, GPX, BPX extending and arranged in the X-axis direction form a single display pixel DPX for performing color display in a predetermined gradation. The display pixels DPX are disposed repeatedly side by side in the X-axis direction on a plate surface of the liquid crystal panel 10, forming a pixel group. A large number of the pixel groups are disposed side by side in the Y-axis direction.

As illustrated in FIG. 4, among the color filters 10h arranged in large numbers in rows and columns as described above, the color filters 10h adjacent to each other are partitioned by a substantially lattice-shaped black matrix (inter-pixel light blocking portion) 10i so as to block light. The black matrix 10i is made of a light blocking material (such as titanium (Ti)), and functions as an "inter-pixel light blocking portion" that blocks leakage light from regions in which voltage control for the liquid crystal layer 10c is difficult, such as between the adjacent pixels PX or a region at the periphery of each pixel portion PX. Thus, the gaps between the pixels PX that are adjacently disposed with respect to the X-axis direction and the Y-axis direction are blocked against light by the black matrix 10i. Accordingly, it is possible to prevent mixing of colors between the pixels PX of different colors arranged in the X-axis direction, or to prevent a brightness variation between the pixels PX of the same color arranged in the Y-axis direction, thus ensuring mutual independence of display. The black matrix 10i includes first partition portions 10i1 partitioning the pixels PX of the same color arranged in the Y-axis direction, and second partition portions 10i2 which partition the pixels PX of different colors arranged in the X-axis direction. A large number of first partition portions 10i1 extend in the X-axis direction and are, with respect to the Y-axis direction, intermittently disposed side by side at an interval approximately corresponding to a long-side dimension (dimension with respect to the first direction) of the color filters 10h (pixels PX). A large number of second partition portions 10i2 extend in the Y-axis direction and are, with respect to the X-axis direction, intermittently disposed side by side at an interval approximately corresponding to the short-side dimension (dimension with respect to the second direction) of the color filters 10h (pixels PX). The first partition portions 10i1 partition the pixels PX of the same color to provide mainly the function of preventing brightness variations between the pixels PX of the same color. On the other hand, the second partition portions 10i2 partition the pixels PX of different colors to provide mainly the function of preventing mixing of colors between the pixels PX of different colors. The black matrix 10i is arranged so as to overlap, when viewed in plan, the gate wires 13 and the source wires 14 on the array substrate 10b side. The colored portions of the color filters 10h have a film thickness greater than that of the black matrix 10i, and are disposed so as to cover the black matrix 10i.

As illustrated in FIG. 6, an overcoat film 10k is disposed over the inner surface of the color filters 10h and the black matrix 10i. The overcoat film 10k is formed as a solid film over substantially the entire areas of the inner surface of the CF substrate 10a, with a film thickness equal to or greater than that of the color filters 10h. A counter electrode 10j is disposed over the inner surface of the overcoat film 10k. The counter electrode 10j is formed as a solid film over substantially the entire areas of the inner surface of the CF substrate 10a. The counter electrode 10j is made of a transparent electrode material, such as indium tin oxide (ITO). The counter electrode 10j is constantly maintained at a certain reference potential. Accordingly, when the pixel electrodes 12 connected to the TFTs 11 are charged as the TFTs 11 are driven, a potential difference is caused between the counter electrode 10j and the pixel electrodes 12. On the basis of the potential difference caused between the counter electrode 10j and the pixel electrodes 12, the alignment state of the liquid crystal molecules included in the liquid crystal layer 10c is changed. As a result, the polarization state of the transmitted light is changed, whereby the amount of transmitted light of the liquid crystal panel 10 is controlled individually for each of the pixels PX, and a predetermined color image is displayed.

As illustrated in FIG. 6, the liquid crystal panel 10 having the above configuration includes spacers 15 which are disposed between the pair of substrates 10a, 10b to keep the interval therebetween. The spacers 15 have a column shape protruding from the overcoat film 10k on the CF substrate 10a toward the array substrate 10b through the liquid crystal layer 10c, with the distal end of the protrusion being abutted against the alignment film 10e of the array substrate 10b on the opposite side. In this way, the spacers 15 make it possible to keep a constant interval, i.e., a cell gap (thickness of the liquid crystal layer 10c), between the pair of substrates 10a, 10b in the display region. As will be described in greater detail later, a large number of spacers 15 are arranged in a dispersed manner with regularity within the display region. The spacers 15 are made of a substantially transparent photosensitive resin material, for example, and are formed on the CF substrate 10a by patterning using a known photolithography method during the production process.

Figure 5:
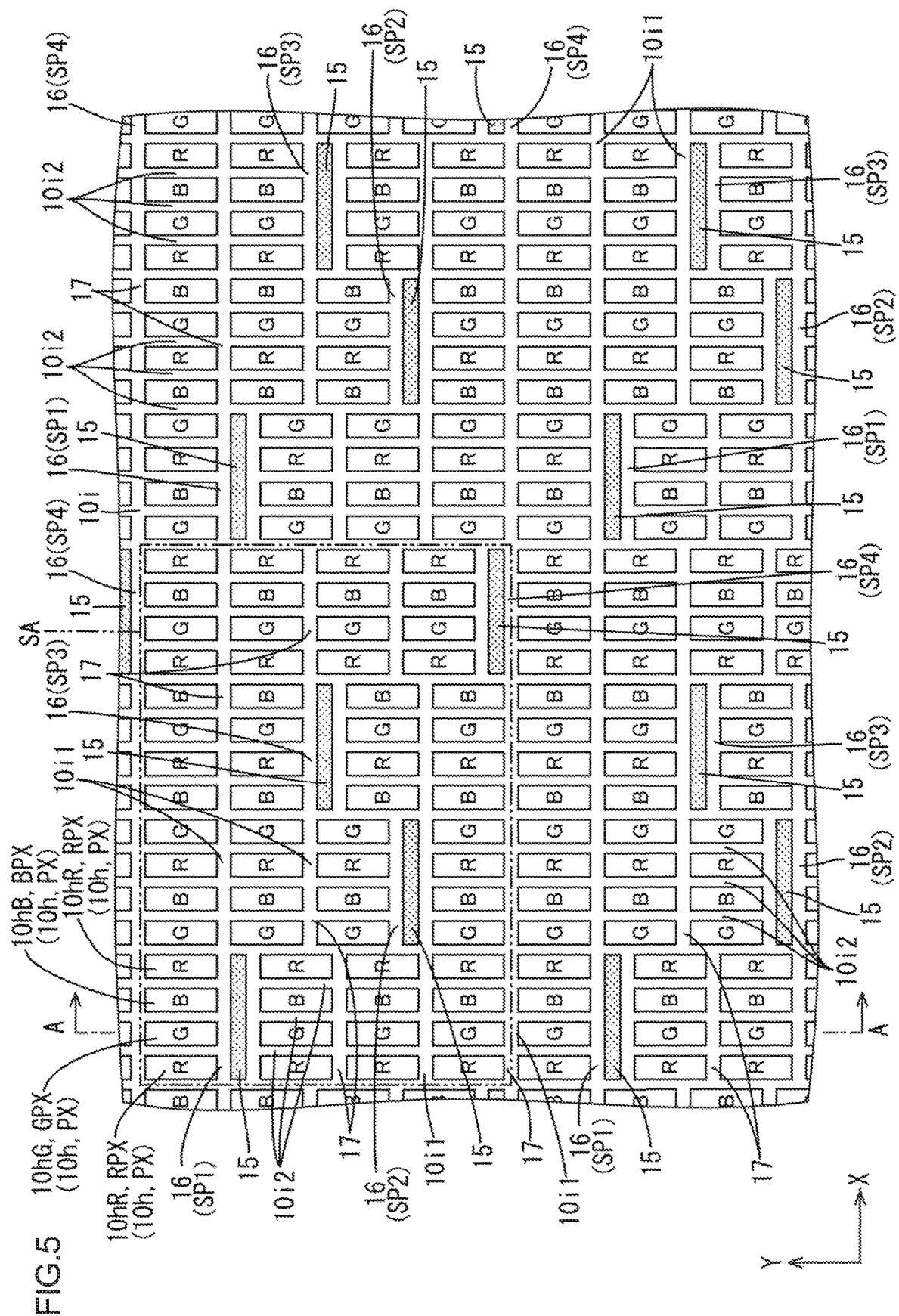
FIG. 5 is a plan view illustrating the distribution of spacers on the CF substrate.

As illustrated in FIG. 5, the spacers 15 are selectively two-dimensionally arranged on the CF substrate 10a in such a way as to overlap some of the first partition portions 10i1 configuring the black matrix 10i. In FIG. 5, the areas in which the spacers 15 are formed are patterned. Of the first partition portions 10i1 extending in the X-axis direction, the portions in which the spacers 15 are arranged provide spacer arranged portions 16, and the portions in which the spacers 15 are not arranged provide spacer non-arranged portions 17. The spacer arranged portions 16 have a formation area straddling the second partition portions 10i2 with respect to the X-axis direction, and are wider than the spacer non-arranged portions 17. Specifically, the spacer arranged portions 16 extend in the X-axis direction, have an oblong quadrangular shape when viewed in plan, and have a formation area that, with respect to the X-axis direction, straddles three (multiple and the same number as the number of the pixels PX configuring the display pixel DPX) second partition portions 10i2, and four (the number obtained by adding one to the number of the second partition portions 10i2 being straddled (the number of the pixels PX configuring the display pixel DPX)) color filters 10h (pixels PX). Accordingly, the ends in the direction of extension of the spacer arranged portions 16 are arranged adjacent to the color filters 10h of the same color with respect to the Y-axis direction. The spacer arranged portions 16 are wider than the spacers 15 with respect to the X-axis direction and the Y-axis direction. That is, the spacer arranged portions 16 include a portion overlapping the spacers 15 when viewed in plan, and a portion protruding from the overlapping portion toward both sides in the X-axis direction and the Y-axis direction. Accordingly, the optical leakage from portions of the liquid crystal layer 10c where voltage control is difficult, as described above, can be prevented in a preferable manner. The spacer arranged portions 16 have a dimension with respect to the X-axis direction which is the same as a size corresponding to the sum of four ("N" which is a number obtained by adding one to the number of the second partition portions 10i2 that are straddled by the spacer arranged portions 16 with respect to the X-axis direction) times the dimension of the color filters 10h with respect to the X-axis direction, and five ("N+1") times the dimension of the second partition portions 10i2 with respect to the X-axis direction. In this configuration, compared to the conventional configuration in which the spacers are arranged separately on a pixel by pixel basis, it becomes possible, even when the pixels PX are reduced in size, to ensure a sufficient formation area for the spacers 15 with respect to the Y-axis direction and the X-axis direction. Accordingly, a sufficient mechanical strength of the spacers 15 can be obtained, and the function for keeping the interval between the substrates 10a, 10b (substrate interval keeping function) can be performed sufficiently. In addition, the spacer non-arranged portions 17 configuring the black matrix 10i have a width narrower than that of the spacer arranged portions 16. Accordingly, it is possible to suppress a decrease in the opening ratio relating to pixels PX as a result of an increase in the formation area for the spacers 15. Thus, an increase in resolution can be achieved in a preferable manner. With respect to most of the second partition portions 10i2, the spacers 15 are not arranged. However, the spacers 15 are arranged in portions that are straddled by the spacer arranged portions 16 in the first partition portions 10i1.

As illustrated in FIG. 5, three or more spacer arranged portions 16 are disposed at positions sandwiching color filters 10h (pixels PX) with respect to each of the Y-axis direction and the X-axis direction. More specifically, the spacer arranged portions 16 are periodically disposed at positions sandwiching four color filters 10h with respect to the Y-axis direction, and positions sandwiching 12 color filters 10h with respect to the X-axis direction, thereby configuring spacer arrangement patterns SP1 to SP4. Each display pixel DPX includes three pixels PX producing the mutually different colors of R, G, and B, and produces white color as a whole. Accordingly, the number (12) of the pixels PX sandwiched between two spacer arranged portions 16 with respect to the X-axis direction is the number (3) of the pixels PX configuring the display pixel DPX, multiplied by the number (4) of the pixels PX sandwiched between two spacer arranged portions 16 with respect to the Y-axis direction. That is, when the number of the pixels PX configuring a single display pixel DPX producing white color is "m" (herein "m=3"), and the number of the pixels PX sandwiched between two spacer arranged portions 16 with respect to the Y-axis direction is "n" (herein "n=4"), the number of the pixels PX sandwiched between two spacer arranged portions 16 with respect to the X-axis direction is "m·n" (herein "m·n=12"). It is noted that "m" and "n" are both natural numbers of two or more. In other words, each display pixel DPX producing white color is configured from a total of "a·b" (herein "a·b=3") pixels PX; that is, "a" (herein "a=1") pixels PX arranged in the first direction and producing mutually different colors, and "b" (herein "b=3") pixels PX arranged in the second direction and producing mutually different colors. The spacer arranged portions 16 are disposed at positions sandwiching "a·n" (herein "a·n=4") pixels PX with respect to the first direction, and at positions sandwiching "b·n" (herein "b·n"=12)) pixels PX with respect to the second direction. Herein, "a" is a natural number, and "b" and "n" are both natural numbers of two or more. Thus, the spacer arranged portions 16 are periodically repeatedly arranged at positions sandwiching a certain number of pixels PX with respect to each of the Y-axis direction and the X-axis direction. Hence, three or more spacers 15 are arranged in a dispersed manner with a two-dimensional periodicity in the black matrix 10i. Accordingly, visual recognition of the spacer arranged portions 16 in which the spacers 15 are arranged becomes difficult, and the substrate interval keeping function of the spacers 15 can be stably performed. In addition, because the number of the display pixels dpx disposed between the adjacent spacers 15 with respect to each of the Y-axis direction and the X-axis direction becomes the same at four, the substrate interval keeping function of the spacers 15 can be more stably provided.

As illustrated in FIG. 5, four (multiple) spacer arrangement patterns SP1 to SP4 are provided such that the respective spacer arranged portions 16 are displaced with respect to the Y-axis direction. Specifically, in a spacer arrangement reference region SA (indicated by dashed and double-dotted lines in FIG. 5) in which one of the spacer arranged portions 16 configuring each of the four spacer arrangement patterns SP1 to SP4 is disposed, a first spacer arrangement pattern SP1, a second spacer arrangement pattern SP2, a third spacer arrangement pattern SP3, and a fourth spacer arrangement pattern SP4 are provided in order from the leftmost spacer arranged portion 16 of the spacer arrangement reference region SA. The spacer arranged portions 16 configuring each of the spacer arrangement patterns SP1 to SP4 are periodically repeatedly arranged in accordance with the rule described in the preceding paragraph. The spacer arranged portions 16 configuring the second spacer arrangement pattern SP2 are displaced, from the spacer arranged portions 16 configuring the first spacer arrangement pattern SP1, toward the bottom of FIG. 5 by two color filters 10*h* (pixels PX) with respect to the Y-axis direction. The spacer arranged portions 16 configuring the third spacer arrangement pattern SP3 are displaced, from the spacer arranged portions 16 configuring the second spacer arrangement pattern SP2, toward the top of FIG. 5 by one color filter 10*h* with respect to the Y-axis direction. The spacer arranged portions 16 configuring the fourth spacer arrangement pattern SP4 are displaced, from the spacer arranged portions 16 configuring the third spacer arrangement pattern SP3, toward the bottom of FIG. 5 by two color filters 10*h* with respect to the Y-axis direction. Thus, the spacer arranged portions 16 configuring the respective spacer arrangement patterns SP1 to SP4 are periodically arranged in a mutually displaced arrangement with respect to the Y-axis direction, and are dispersed with a uniform distribution density, rather than being unevenly distributed, in the plane of the substrates 10*a*, 10*b*. In this way, the substrate interval keeping function of the spacers 15 arranged in the spacer arranged portions 16 can be more stably provided, making visual recognition of the spacer arranged portions 16 difficult.

As illustrated in FIG. 5, the spacer arranged portions 16 have a width dimension (dimension with respect to the Y-axis direction) which is smaller than the size corresponding to the sum of a long-side dimension (dimension with respect to the Y-axis direction) of the color filters 10*h* (pixels PX) and a width dimension (dimension with respect to the Y-axis direction) of a pair of first partition portions 10*i*1 sandwiching the color filters 10*h* (pixels PX) with respect to the Y-axis direction. Accordingly, the color filters 10*h* adjacent to each other with respect to the X-axis direction include those displaced with respect to the Y-axis direction by the difference in width dimension between the spacer arranged portions 16 and the spacer non-arranged portions 17. Specifically, the color filters 10*h* adjacent to the spacer arranged portions 16 of each of the spacer arrangement patterns SP1 to SP4 with respect to the X-axis direction are displaced with respect to the Y-axis direction from the color filters 10*h* which are adjacent thereto with respect to the X-axis direction and which are adjacent to the spacer arranged portions 16 with respect to the Y-axis direction, where the amount of displacement is the difference in width dimension between the spacer arranged portions 16 and the spacer non-arranged portions 17. In this way, the dimension of the color filters 10*h* with respect to the Y-axis direction becomes constant, whereby the opening ratios of the pixels PX are made uniform. Accordingly, the development of a brightness difference due to a difference in opening ratio between the respective pixels PX can be avoided, and an increase in resolution can be achieved in a more preferable manner. It should be noted that there may be a case in which, even when a color filter 10*h* is adjacent to a spacer arranged portion 16 with respect to the X-axis direction, the color filter 10*h* is not displaced with respect to the Y-axis direction from a color filter 10*h* adjacent to a different spacer arranged portion 16 with respect to the Y-axis direction, or from a color filter 10*h* which is not adjacent to any of the spacer arranged portions 16 with respect to the X-axis direction. Further, in terms of the spacer arrangement reference region SA or the display region as a whole, all of the first partition portions 10*i*1 arranged in the Y-axis direction include the spacer arranged portions 16. Accordingly, the color filters 10*h* disposed at both ends with respect to the Y-axis direction are not displaced with respect to the Y-axis direction.

The pixel electrodes 12 structured on the array substrate 10*b* to overlap the color filters 10*h* are two-dimensionally arranged, though not illustrated, in the same way as the color filters 10*h*. Correspondingly, the gate wires 13 structured to overlap the black matrix 10*i* may be bent so as to follow the bends of the first partition portions 10*i*1. Alternatively, the gate wires 13 may extend linearly in the X-axis direction without bending.

As described above, the liquid crystal panel (display device) 10 according to the present embodiment is provided with: the pair of substrates 10*a*, 10*b* bonded to each other; the pixels PX arranged in each of the first direction and the second direction perpendicular to each other in the plane of the substrates 10*a*, 10*b*; the black matrix (inter-pixel light blocking portion) 10*i* which includes the first partition portions 10*i*1 partitioning the pixels PX arranged in the first direction and the second partition portions 10*i*2 partitioning the pixels PX arranged in the second direction, and which blocks light between adjacent pixels PX; the spacers 15 disposed between the pair of substrates 10*a*, 10*b*; the spacer non-arranged portions 17 which are included in the first partition portions 10*i*1 and in which the spacers 15 are not arranged; and the spacer arranged portions 16 which are included in the first partition portions 10*i*1 and in which the spacers 15 are arranged. The spacer arranged portions 16 have a formation area straddling the second partition portions 1012 with respect to the second direction, and are wider than the spacer non-arranged portions 17.

In this way, the pixels PX arranged in each of the first direction and the second direction perpendicular to each other in the plane of the substrates 10*a*, 10*b* are partitioned, with respect to the first direction and the second direction, by the first partition portions 10*i*1 and the second partition portions 10*i*2 configuring the black matrix 10*i*, whereby light is blocked between the adjacent pixels PX. Meanwhile, the spacers 15 are disposed between the pair of substrates 10*a*, 10*b* bonded to each other, so that the interval between the pair of substrates 10*a*, 10*b* is kept. The first partition portions 10*i*1 of the black matrix 10*i* include the spacer non-arranged portions 17 in which the spacers 15 are not arranged, and the spacer arranged portions 16 in which the spacers 15 are arranged. The spacer arranged portions 16 have a formation area straddling the second partition portions 10*i*2 with respect to the second direction, and are wider than the spacer non-arranged portions 17. Accordingly, even when the pixels PX are reduced in size, a sufficient formation area can be ensured for the spacers 15 with respect to the first direction and the second direction. Thus, a sufficient mechanical strength of the spacers 15 can be obtained, allowing the spacers 15 to be sized to make the production easy (not difficult). In addition, the spacer non-arranged portions 17 have a width narrower than that of the spacer arranged portions 16. Accordingly, it is possible to suppress the decrease in the opening ratios of the pixels PX due to an increase in the formation area for the spacers 15. Thus, an increase in resolution can be achieved in a preferable manner.

The black matrix 10*i* includes first partition portions 10*i*1 and second partition portions 10*i*2. Three or more spacer arranged portions 16 are disposed at positions sandwiching pixels PX with respect to each of the first direction and the second direction. In this way, three or more spacers 15 are two-dimensionally arranged in a dispersed manner in the black matrix 10*i*. Accordingly, visual recognition of the spacer arranged portions 16, in which the spacers 15 are arranged, is made difficult.

The spacer arranged portions 16 are periodically disposed at positions sandwiching a certain number of pixels PX with respect to each of the first direction and the second direction, whereby the spacer arrangement patterns SP1 to SP4 are configured. In this way, the spacers 15 are arranged with a two-dimensional periodicity in the black matrix 10$i$. Accordingly, the interval between the pair of substrates 10$a$, 10$b$ is more stably kept by the spacers 15, and visual recognition of the spacer arranged portions 16 becomes difficult.

Spacer arrangement patterns SP1 to SP4 are provided such that the respective spacer arranged portions 16 are displaced with respect to the first direction. Because the spacer arranged portions 16 configuring the spacer arrangement patterns SP1 to SP4 are displaced with respect to the first direction arrange, the interval between the pair of substrates 10$a$, 10$b$ is more stably kept by the spacers 15, and visual recognition of the spacer arranged portions 16 becomes more difficult.

Each display pixel DPX that produces white color is configured from pixels PX which are arranged in at least one of the first direction and the second direction and which produce mutually different colors. The spacer arranged portions 16 are disposed at positions sandwiching the same number of display pixels DPX with respect to each of the first direction and the second direction. In this way, the number of the display pixels DPX that are disposed between adjacent spacers 15 with respect to the first direction and the second direction becomes the same. Accordingly, the interval between the pair of substrates 10$a$, 10$b$ can be more stably kept by the spacers 15, and visual recognition of the spacer arranged portions 16 becomes difficult.

The dimension of the spacer arranged portions 16 with respect to the first direction is smaller than the size corresponding to the sum of the dimension of the pixels PX with respect to the first direction and the dimension, with respect to the first direction, of a pair of first partition portions 10$i$1 sandwiching the pixels PX with respect to the first direction. When the resolution of the liquid crystal panel 10 is not so high, the pair of substrates 10$a$, 10$b$ can be stably kept with respect to each other even when the spacers 15 are sized as described above.

Among the pixels PX, the pixels PX which are adjacent, with respect to the second direction, to the spacer arranged portions 16 in which the spacers 15 are arranged are displaced, with respect to the first direction, from the pixels PX which are adjacent thereto with respect to the second direction and which are adjacent to the spacer arranged portions 16 with respect to the first direction, where the amount of displacement is the difference in width between the spacer arranged portions 16 and the spacer non-arranged portions 17. In this way, the pixels PX adjacent to the spacer arranged portions 16 with respect to the second direction and the pixels PX which are adjacent to those pixels PX with respect to the second direction and which are adjacent to the spacer arranged portions 16 with respect to the first direction have the same dimension with respect to the first direction. Accordingly, a difference in opening ratio becomes less likely to be caused between the pixels PX, and an increase in resolution can be achieved in a more preferable manner.

The dimension of the spacer arranged portions 16 with respect to the second direction is the same as the size corresponding to the sum of "N" times the dimension of the pixels PX with respect to the second direction and "N+1" times the dimension of the second partition portions 10$i$2 with respect to the second direction. In this way, the pixels PX sandwiching the spacer arranged portions 16 from both sides with respect to the second direction are arrayed linearly in the first direction with respect to the first direction without being displaced from the adjacent pixels PX with respect to the second direction. In this way, the opening ratios of the pixels PX can be made uniform in a preferable manner. In the foregoing, "N" is a natural number of two or more, and is equal to a number obtained by adding one to the number of the second partition portions 10$i$2 that the spacer arranged portions 16 straddle with respect to the second direction.

The head-mounted display HMD according to the present embodiment is provided with at least: the liquid crystal panel 10; the lens portion RE for imaging an image displayed on the liquid crystal panel 10 onto the eyeball (eye) EY of a user; and the head-mounted unit HMDa which includes the liquid crystal panel 10 and the lens portion RE and is worn on the head HD of the user. According to the head-mounted display HMD having the above configuration, when the user uses the head-mounted unit HMDa worn on the head HD, an image being displayed on the liquid crystal panel 10 is imaged by the lens portion RE onto the eyeball EY of the user, and the user can view, in magnified form, the image being displayed on the liquid crystal panel 10. In such uses where the image being displayed on the liquid crystal panel 10 is viewed by the user in magnified form, the liquid crystal panel 10 tends to be required to provide higher levels of resolution. With the liquid crystal panel 10, which is adapted for achieving high resolution, a sufficiently high display quality can be obtained.

Second Embodiment

A second embodiment of the present invention will be described with reference to FIG. 7 or FIG. 8. In the second embodiment, the formation area for spacers 115 and spacer arranged portions 116 are modified. Redundant descriptions of structures, operations, and effects similar to those of the first embodiment will be omitted.

Figure 7:
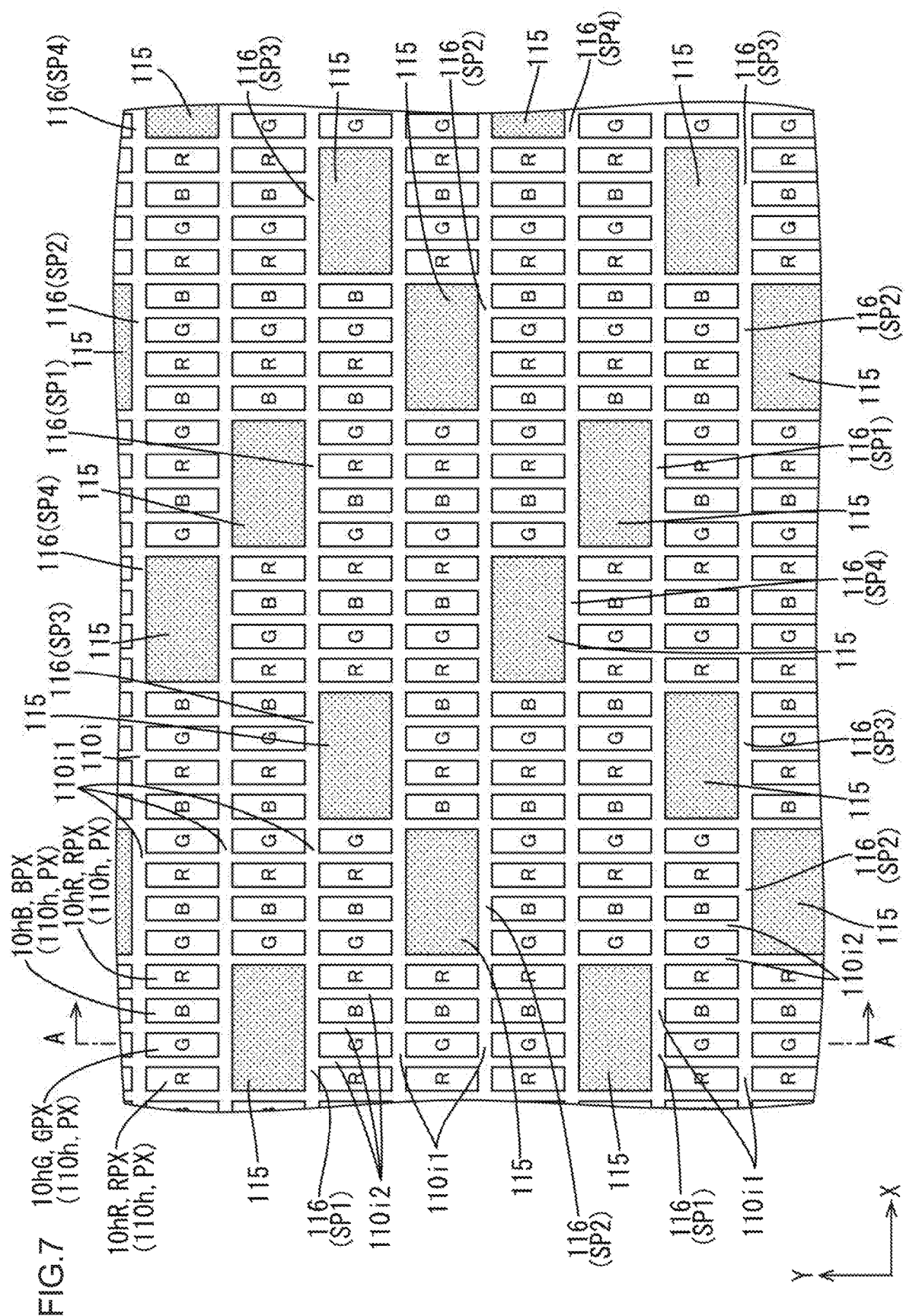
FIG. 7 is a plan view illustrating the distribution of spacers on the CF substrate according to the second embodiment of the present invention.
Figure 8:
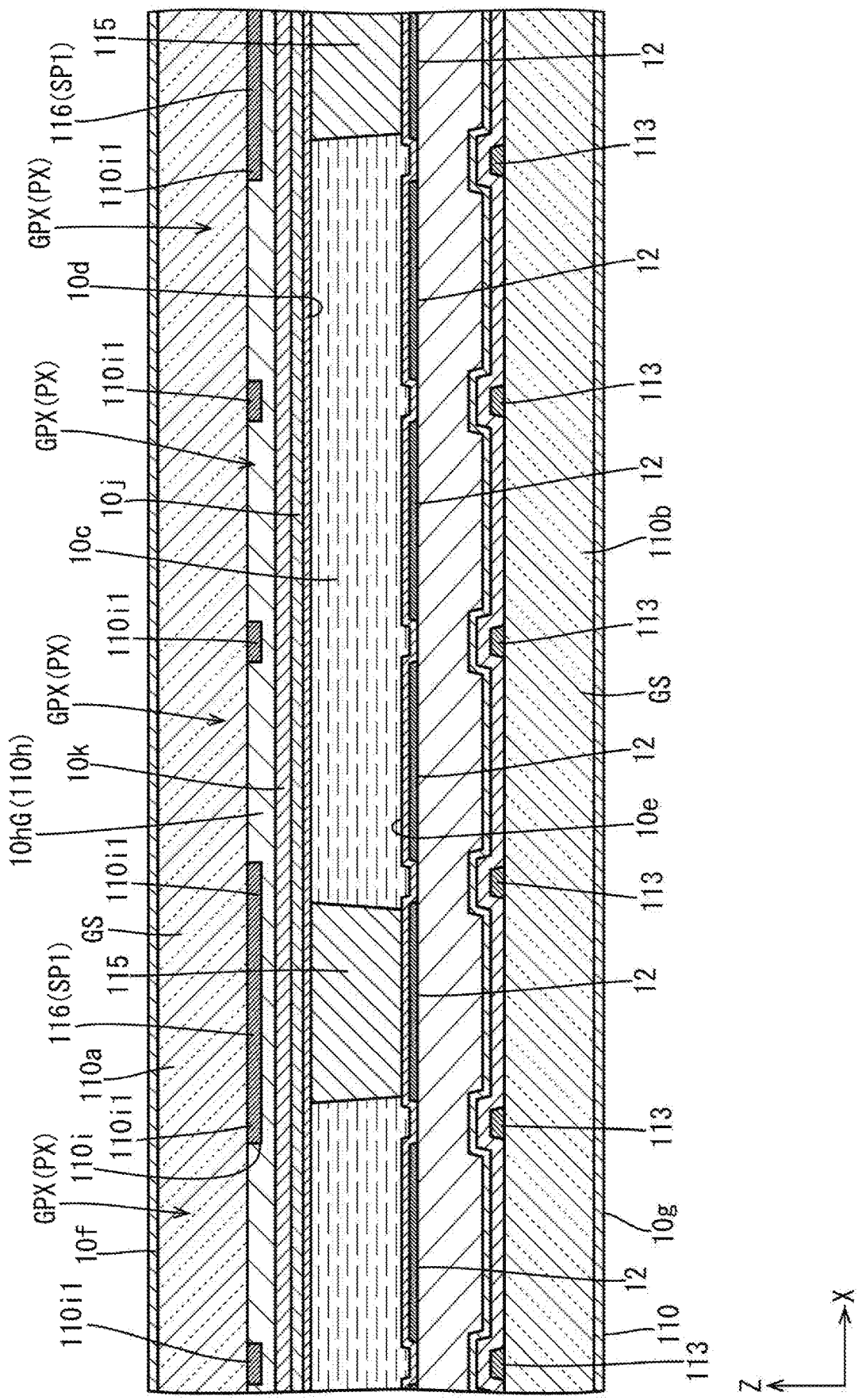
FIG. 8 is a cross sectional view taken along line A-A of FIG. 7.

As illustrated in FIG. 7 and FIG. 8, the spacers 115 according to the present embodiment have a width dimension (dimension with respect to the Y-axis direction) which is substantially equal to a long-side dimension (dimension with respect to the Y-axis direction) of color filters 110$h$ (pixels PX). The spacer arranged portions 116, in which the spacers 115 are arranged, have a width dimension which is greater than a width dimension of the spacers 115. Thus, the spacer arranged portions 116 are included in each of a pair of first partition portions 110$i$1 sandwiching, from both sides with respect to the Y-axis direction, the color filters 110$h$ adjacent to the arranged spacers 115 with respect to the X-axis direction. That is, the spacer arranged portions 116 are constituted by partially extended and mutually joined parts of the pair of first partition portions 110$i$1. Accordingly, the width dimension of the spacers 115 has the magnitude obtained by subtracting, from a dimension that is the sum of the long-side dimension of the pixels PX and the width dimension of the pair of first partition portions 110$i$1 sandwiching the pixels PX with respect to the Y-axis direction, the width dimension of the pair of first partition portions 110$i$1 sandwiching the spacers 115 with respect to the Y-axis direction.

The spacers 115 have the formation area (size) as described above. Accordingly, even when an increase in resolution is made and the pixels PX are reduced in size, a stable substrate interval keeping function can be provided. In addition, the color filters 110$h$ that are adjacent to each other with respect to the X-axis direction are arrayed linearly without being displaced with respect to the Y-axis direction. Accordingly, the first partition portions 110$i$1 and the second partition portions 110$i$2, of which a black matrix 110$i$ partitioning the color filters 110$h$ is configured, each have a uniform width. Gate wires 113 disposed on an array substrate 110b side to drive the pixels PX are arranged to overlap the first partition portions 110i1, and linearly extend in the X-axis direction in which the first partition portions 110i1 extend. With respect to the pixels PX that overlap the spacers 115 and the spacer arranged portions 116, since it is difficult to obtain a desired brightness even if data for display is supplied, the data may be omitted. It is also possible to adjust the brightness of the pixels PX around the pixels PX overlapping the spacers 115 and the spacer arranged portions 116, in order to obtain a display as if the pixels PX overlapping the spacers 115 and the spacer arranged portions 116 were driven similarly to the other non-overlapping pixels FX.

As described above, according to the present embodiment, the dimension of the spacer arrangement 116 with respect to the first direction is equal to or greater than the size corresponding to the sum of the dimension of the pixels PX with respect to the first direction and the dimension with respect to the first direction of the pair of first partition portions 110i1 sandwiching the pixels PX with respect to the first direction. When the resolution of the liquid crystal panel 110 is increased, the pair of substrate 110a, 110b can be stably kept with respect to each other due to the above-described size of the spacers 115.

The dimension of the spacer arranged portions 116 with respect to the first direction is the same as the size corresponding to the sum of the dimension of the pixels PX with respect to the first direction and the dimension with respect to the first direction of the pair of first partition portions 110i1 sandwiching the pixels PX with respect to the first direction. In this way, the pixels PX adjacent to each other with respect to the second direction are linearly arrayed without being displaced with respect to the first direction. Accordingly, the opening ratios of the pixels PX can be made uniform and wires and the like for driving the pixels PX can be arranged in a preferable manner.

Third Embodiment

A third embodiment of the present invention will be described with reference to FIG. 9. In the third embodiment, the formation area for spacers 215 and spacer arranged portions 216 are modified from the second embodiment. Redundant descriptions of structures, operations, and effects similar to those of the first embodiment will be omitted.

Figure 9:
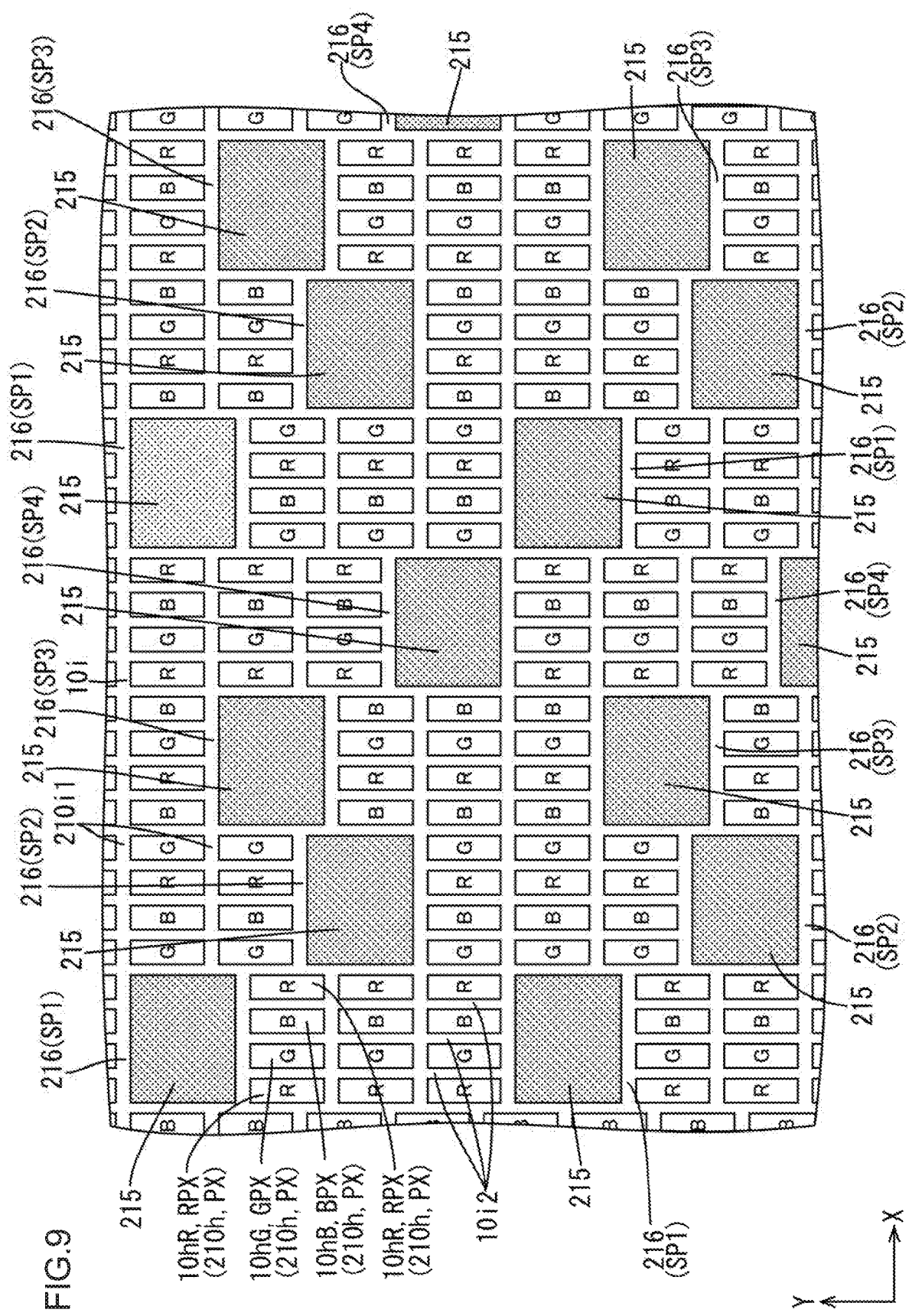
FIG. 9 is a plan view illustrating the distribution of spacers on the CF substrate according to the third embodiment of the present invention.

As illustrated in FIG. 9, the spacer arrangement 216 according to the present embodiment has a width dimension (dimension with respect to the Y-axis direction) which is greater than a size corresponding to the sum of a long-side dimension (dimension with respect to the Y-axis direction) of color filters 210h (pixels PX) and a width dimension (dimension with respect to the Y-axis direction) of a pair of first partition portions 210i1 sandwiching the color filters 210h (pixels PX) with respect to the Y-axis direction. Accordingly, the color filters 210h adjacent, with respect to the X-axis direction, to the spacer arranged portions 216 configuring the spacer arrangement patterns SP1 to SP4 are displaced, with respect to the Y-axis direction, from the color filters 210h which are adjacent thereto with respect to the Y-axis direction and which are adjacent, with respect to the X-axis direction, to the spacer arranged portions 216, where the amount of displacement is the difference between the width dimension of the spacer arranged portions 216 and the size corresponding to the sum of the long-side dimension of the color filters 210h and the width dimension of the pair of first partition portions 210i1 sandwiching the color filters 210h with respect to the Y-axis direction. In this way, the dimension of the color filters 210h with respect to the Y-axis direction becomes constant, whereby the opening ratios of the pixels PX are made uniform. In this way, the development of a brightness difference due to a difference in opening ratio between the pixels PX can be avoided. Accordingly, an increase in resolution can be achieved in a more preferable manner.

As described above, according to the present embodiment, the dimension of the spacer arrangement 216 with respect to the first direction is greater than the size corresponding to the sum of the dimension of the pixels PX with respect to the first direction and the dimension with respect to the first direction of the pair of the first partition portions 210i1 sandwiching the pixels PX with respect to the first direction. Of the pixels PX, the pixels PX adjacent with respect to the second direction to the spacer arranged portions 216 in which the spacers 215 are arranged are displaced with respect to the first direction from the pixels PX which are adjacent thereto with respect to the second direction and which are adjacent with respect to the first direction to the spacer arranged portions 216, where the amount of displacement is the difference between the dimension of the spacer arranged portions 216 with respect to the first direction and the size corresponding to the sum of the dimension of the pixels PX with respect to the first direction and the dimension with respect to the first direction of the pair of the first partition portions 210i1 sandwiching the pixels PX with respect to the first direction. In this way, the pixels PX adjacent to the spacer arranged portions 216 with respect to the second direction and the pixels PX which are adjacent to the above pixels PX with respect to the second direction and which are adjacent to the spacer arranged portions 216 with respect to the first direction have the same dimension with respect to the first direction. Accordingly, a difference in opening ratio becomes less likely to be caused between the pixels PX, and an increase in resolution can be achieved in a more preferable manner.

Fourth Embodiment

A fourth embodiment of the present invention will be described with reference to FIG. 10 to FIG. 12. According to the fourth embodiment, the formation area for spacers 315 and spacer arranged portions 316 are modified from the first embodiment, and also the number of spacer arrangement patterns SP1 to SP6 is modified. Redundant descriptions of structures, operations, and effects similar to those of the first embodiment will be omitted.

Figure 10:
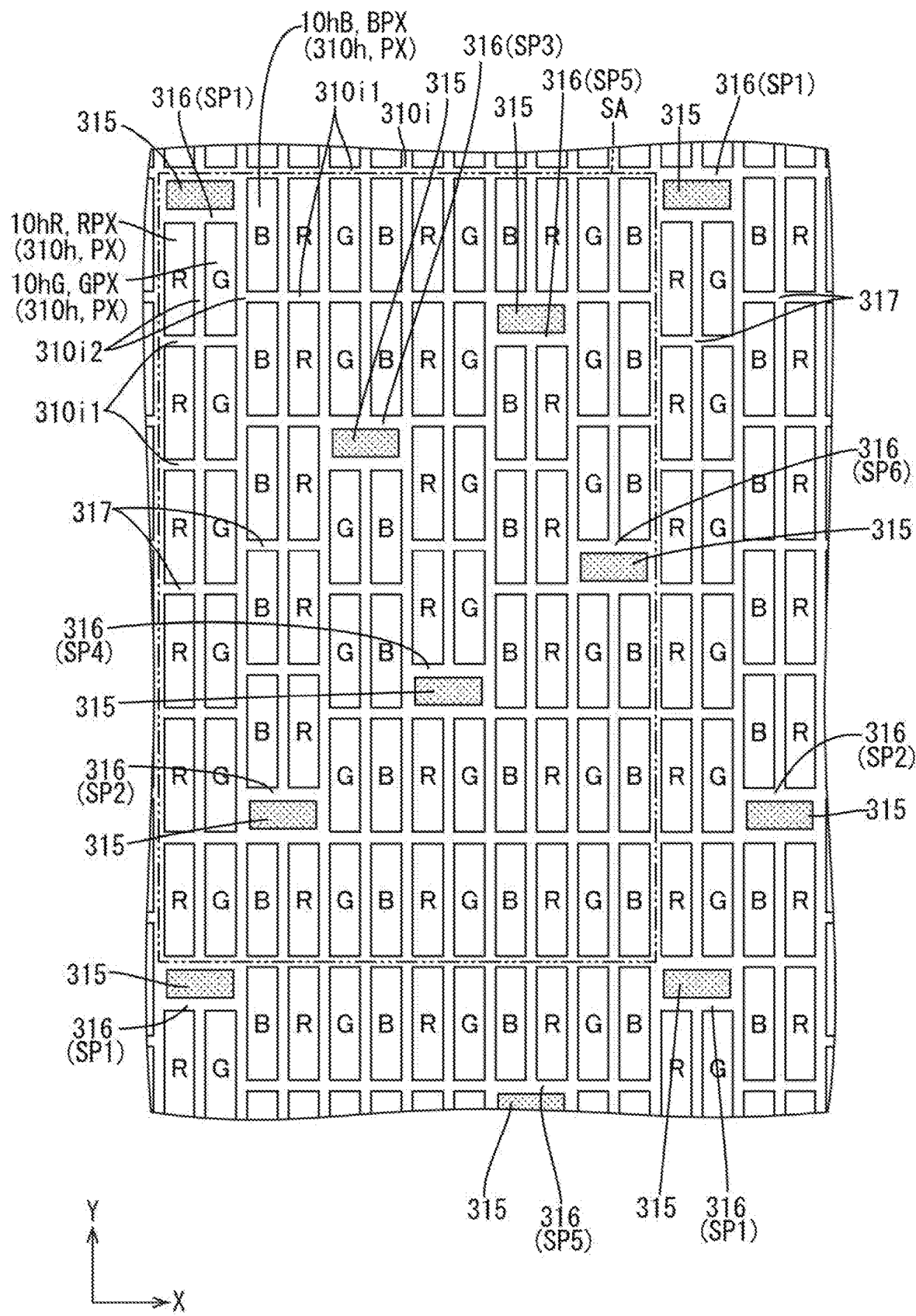
FIG. 10 is a plan view illustrating the distribution of spacers on the CF substrate according to the fourth embodiment of the present invention.

As illustrated in FIG. 10, the spacers 315 and the spacer arranged portions 316 according to the present embodiment have a formation area straddling one second partition portion 310i2 and two color filters 310h (pixels PX) with respect to the X-axis direction. That is, the dimension of the spacers 315 and the spacer arranged portions 316 with respect to the X-axis direction is less than the corresponding dimension of one display pixel DPX (see FIG. 4), and is approximately one half that of the first embodiment.

As illustrated in FIG. 10, the spacer arranged portions 316 are periodically disposed at positions sandwiching six color filters 310h with respect to the Y-axis direction, and at positions sandwiching 10 color filters 310h with respect to the X-axis direction, thus configuring the spacer arrangement patterns SP1 to SP6. Six spacer arrangement patterns SP1 to SP6 are provided such that the respective spacer arranged portions 316 are displaced with respect to the Y-axis direction. Specifically, in a spacer arrangement reference region SA (indicated by dashed and double-dotted lines in FIG. 10) in which one of the spacer arranged portions 316 configuring each of the six spacer arrangement patterns SP1 to SP6 is disposed, a first spacer arrangement pattern SP1, a second spacer arrangement pattern SP2, a third spacer arrangement pattern SP3, a fourth spacer arrangement pattern SP4, a fifth spacer arrangement pattern SP5, and a sixth spacer arrangement pattern SP6 are configured in order from the leftmost spacer arranged portion 316 in the spacer arrangement reference region SA. The spacer arranged portions 316 configuring the respective spacer arrangement patterns SP1 to SP6 are periodically repeatedly arranged in accordance with the above-described rule, and are thereby dispersed with a uniform distribution density, rather than being unevenly distributed, in the plane of the substrates. In this way, the substrate interval keeping function due to the spacers 315 arranged in the spacer arranged portions 316 can be more stably provided, and visual recognition of the spacer arranged portions 316 becomes difficult.

As illustrated in FIG. 10, the width dimension (dimension with respect to the Y-axis direction) of the spacer arranged portions 316 is smaller than a size corresponding to the sum of a long-side dimension (dimension with respect to the Y-axis direction) of the color filters 310h (pixels PX) and a width dimension (dimension with respect to the Y-axis direction) of a pair of first partition portion 310i1 sandwiching the color filters 310h (pixels FX) with respect to the Y-axis direction, as in the first embodiment. The color filters 310h adjacent with respect to the X-axis direction to the spacer arranged portions 316 configuring the spacer arrangement patterns SP1 to SP6 are displaced with respect to the Y-axis direction from the color filters 310h which are adjacent thereto with respect to the Y-axis direction and adjacent to the spacer arranged portions 316 with respect to the X-axis direction, where the amount of displacement is the difference in width dimension between the spacer arranged portions 316 and the spacer non-arranged portions 317. In this way, the dimension of the color filters 310h with respect to the Y-axis direction becomes constant, whereby the opening ratios of the pixels PX are made uniform.

To verify the superiority of the liquid crystal panel provided with the spacers 315 and the spacer arranged portions 316 having the above-described arrangement, a first comparative experiment was conducted. In the first comparative experiment, a liquid crystal panel according to example 1 was provided with the spacers 315 and the spacer arranged portions 316 that have been described above, and liquid crystal panels according to comparative examples 1 and 2 were provided with arrangements of the spacers 315 and the spacer arranged portions 316 different from that of example 1. The spacer density, the opening ratio, and the rate of increase in opening ratio according to example 1 and comparative examples 1 and 2 were calculated, and the results are shown in FIG. 12. Example 1 and comparative examples 1 and 2 commonly had the resolution of 564 dots per inch (dpi), a pixel to pixel pitch (array pitch of the display pixel DPX) of 45 μm, and a width of 4 μm for the spacer non-arranged portions 317 of the first partition portion 310i1 and the second partition portion 310i2 of the black matrix 310i. Thus, in example 1 and comparative examples 1 and 2, the color filters 310h (pixels PX) had a short-side dimension of 11 μm and a long-side dimension of 41 μm. In example 1 and comparative example 1, the spacers 315 had a common structure in which the width dimension was 10 μm and the length dimension was 24 μm. In example 1 and comparative example 1, the spacer arranged portions 316 in which the spacers 315 were arranged commonly had the size obtained by adding 10 μm to each of the width dimension and length dimension of the spacers 315 (width dimension of 20 μm, length dimension of 34 μm).

Figure 11:
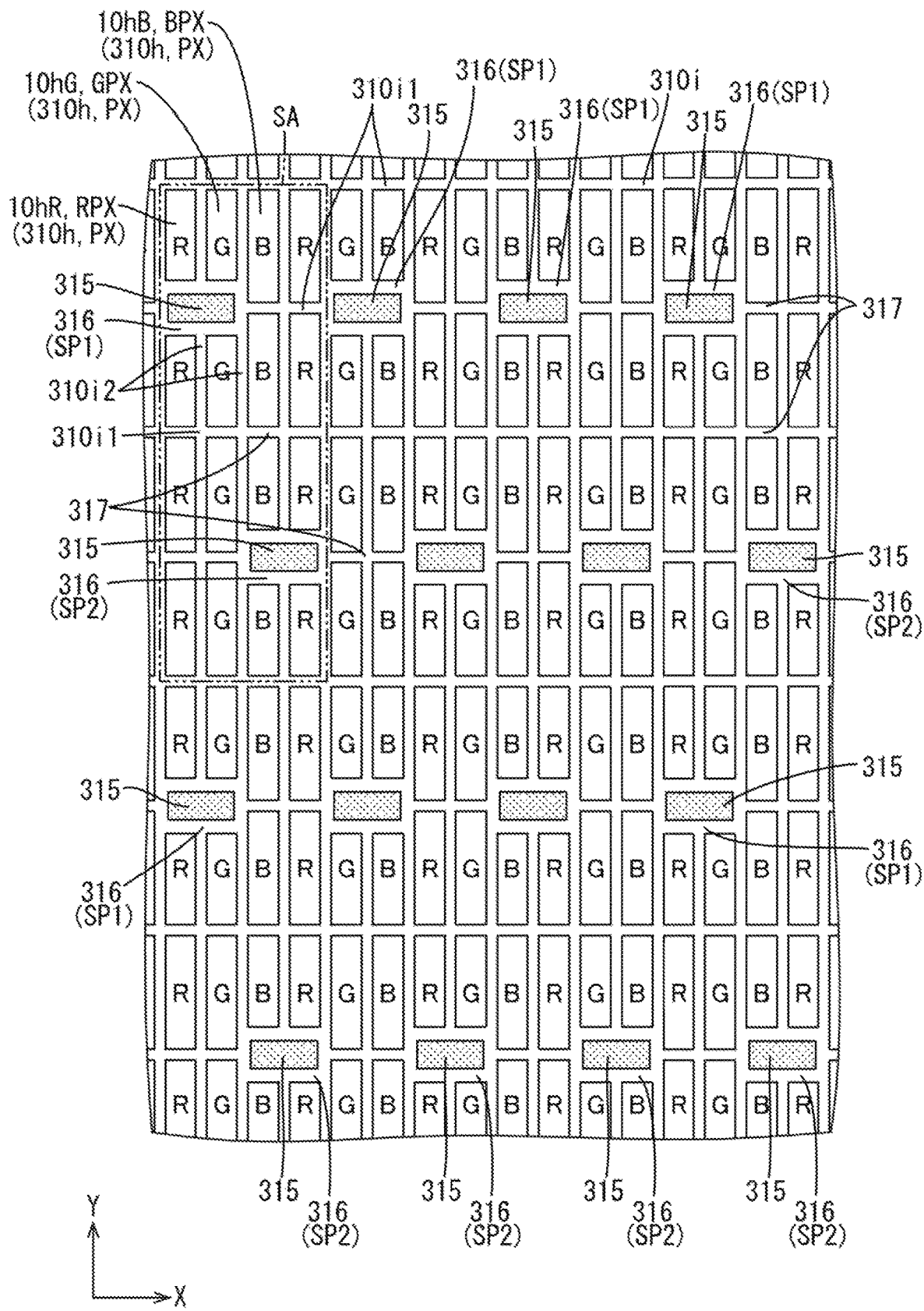
FIG. 11 is a plan view illustrating the distribution of spacers on the CF substrate according to comparative example 1 of the first comparative experiment.

As illustrated in FIG. 11, in comparative example 1, the spacers 315 and the spacer arranged portions 316 were periodically disposed at positions sandwiching four color filters 310h with respect to the Y-axis direction, and at positions sandwiching two (the same number as the number of the color filters 310h straddled by the spacers 315) color filters 310h with respect to the X-axis direction, thereby configuring two spacer arrangement patterns SP1, SP2. The spacers 315 and the spacer arranged portions 316 configuring the two spacer arrangement patterns SP1, SP2 were displaced by two (one half the number of the color filters 310h that were sandwiched with respect to the Y-axis direction) color filters 310h with respect to the Y-axis direction. That is, the spacers 315 and the spacer arranged portions 316 configuring the two spacer arrangement patterns SP1, SP2 were two-dimensionally arranged in a staggered manner. Of the color filters 310h (pixels PX) in comparative example 1, those adjacent to the spacers 315 and the spacer arranged portions 316 with respect to the Y-axis direction, compared to those which were not adjacent thereto (having the dimension of 33 μm with respect to the Y-axis direction), had a smaller dimension with respect to the Y-axis direction, where the difference was 8 μm. Thus, in comparative example 1, the arrangement space for the color filters 310h (pixels PX) was reduced by the arrangement space for the spacers 315 and the spacer arranged portions 316. In comparative example 2, the spacers 315 and the spacer arranged portions 316 were distributed in the same way as in comparative example 1, and are not illustrated. Comparative example 2 differed from comparative example 1 in that the spacers 315 had a width dimension of 10 μm and a length dimension of 15 μm (i.e., the length dimension was smaller by 9 μm). In comparative example 2, the spacer arranged portions 316 in which the spacers 315 were arranged had the same size as in comparative example 1 (width dimension of 20 μm, length dimension of 34 μm). This was because even if the length dimension were to be decreased in accordance with the spacer size, the area would be too small for an opening portion, or the opening shape would become irregular, creating irregular portions that would be readily visible. In comparative examples 1 and 2, the color filters 310h had different dimensions, i.e., different opening areas, with respect to the Y-axis direction. Accordingly, when the liquid crystal panel is used as a head-mounted display and a magnified display is performed using the lens portion, a brightness difference between the pixels PX becomes more readily visible. If the dimension of the color filters 310h with respect to the Y-axis direction (opening area) were to be made uniform, the color filters 310h would have to be made smaller, resulting in a decrease in the opening ratio.

Referring to FIG. 12, the "spacer density" refers to the ratio (unit is "%") of the total of the areas of the spacers 315 occupying the spacer arrangement reference region SA. The "opening ratio" refers to the ratio (unit is "%") of the total of the areas of the color filters 310h (pixels PX) occupying the spacer arrangement reference region SA. The "rate of increase in opening ratio" refers to the rate (unit is "%") obtained by dividing the difference between the opening ratio according to example 1 and the opening ratio according to comparative examples 1 and 2 by the opening ratio according to comparative examples 1 and 2. FIG. 12 indicates that, with respect to spacer density, example 1 (2.8%) was smaller than comparative example 1 (4.4%) but was equal to comparative example 2 (2.8%). Since example 1 and comparative example 1 had the same size of the spacers 315, the difference in spacer density was due to the difference in distribution of the spacers 315. Meanwhile, while example 1 and comparative example 2 had different distributions of the spacers 315, they had the same spacer density due to the difference in length dimension of the spacers 315. That is, it can be said that, when a distribution of the spacers 315 such as in comparative examples 1 and 2 were to be adopted, the spacers 315 would have to be reduced in size in order to obtain the same spacer density as that of example 1. With respect to opening ratio, example 1 (63.1%) was greater than comparative examples 1 and 2 (60.3%), where the rate of increase in opening ratio calculated on the basis of the difference was approximately 5%. Thus, in example 1, compared to comparative examples 1 and 2, the opening ratio was increased, thereby achieving an increase in brightness and an increase in optical utilization efficiency.

Fifth Embodiment

A fifth embodiment of the present invention will be described with reference to FIG. 13 to FIG. 15. In the fifth embodiment, the formation area for spacers 415 and spacer arranged portions 416 is modified from the fourth embodiment, and the number of spacer arrangement patterns SP1 to SP9 is also modified. Redundant descriptions of structures, operations, and effects similar to those of the fourth embodiment will be omitted.

Figure 13:
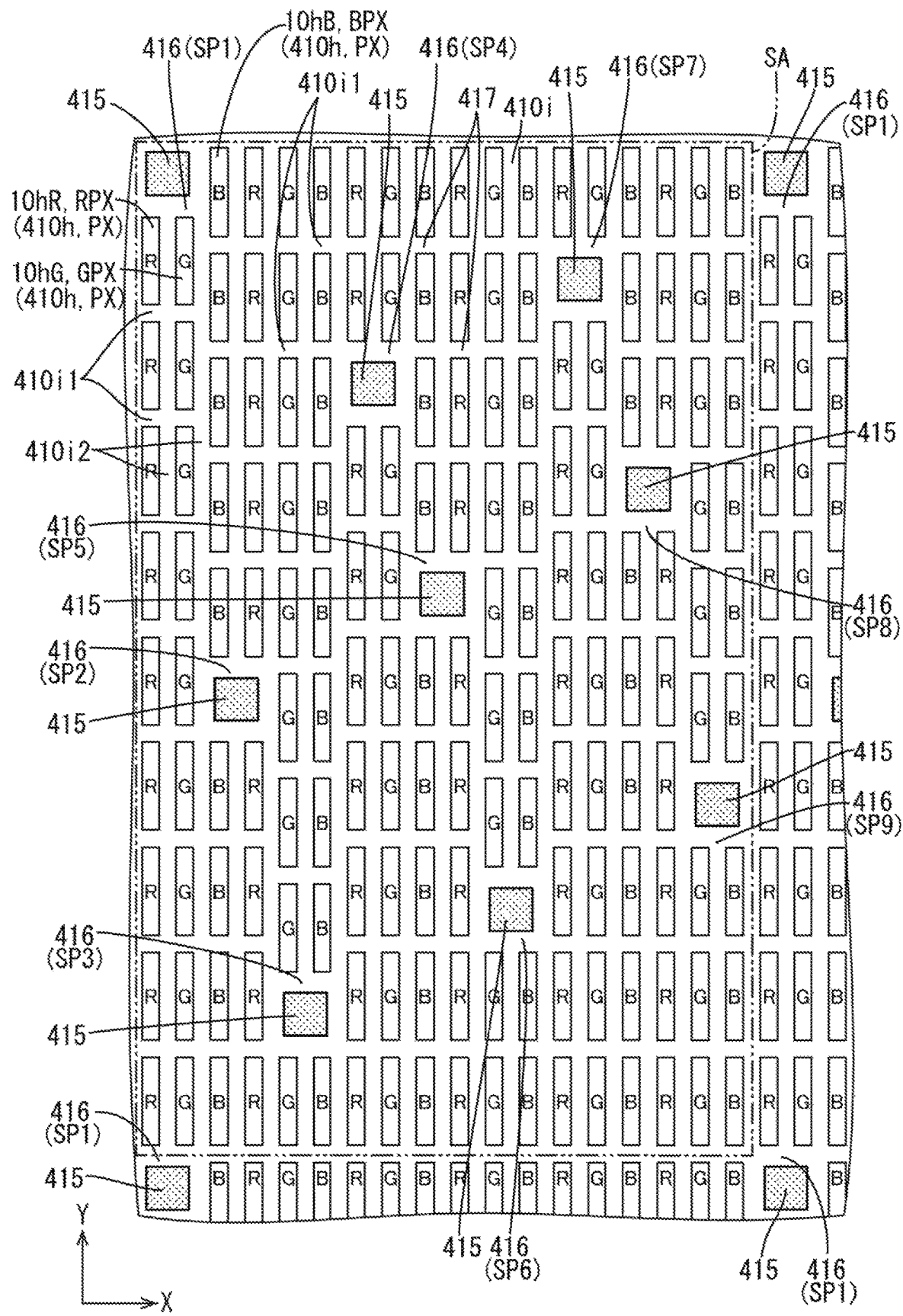
FIG. 13 is a plan view illustrating the distribution of spacers on the CF substrate according to the fifth embodiment of the present invention.

As illustrated in FIG. 13, the spacer arranged portions 416 according to the present embodiment are periodically disposed at positions sandwiching nine color filters 410h with respect to the Y-axis direction, and at positions sandwiching 16 color filters 410h with respect to the X-axis direction, thus configuring the spacer arrangement patterns SP1 to SP9. Nine spacer arrangement patterns SP1 to SP9 are provided such that the respective spacer arranged portions 416 are displaced from each other with respect to the Y-axis direction. Specifically, in a spacer arrangement reference region SA (indicated by dashed and double-dotted lines in FIG. 13) in which one of the spacer arranged portions 416 configuring each of the nine spacer arrangement patterns SP1 to SP9 is disposed, a first spacer arrangement pattern SP1, a second spacer arrangement pattern SP2, a third spacer arrangement pattern SP3, a fourth spacer arrangement pattern SP4, a fifth spacer arrangement pattern SP5, a sixth spacer arrangement pattern SP6, a seventh spacer arrangement pattern SP7, an eighth spacer arrangement pattern SP8, and a ninth spacer arrangement pattern SP9 are configured in order from the leftmost spacer arranged portion 416 in the spacer arrangement reference region SA. The spacer arranged portions 416 configuring each of the spacer arrangement patterns SP1 to SP9 are periodically repeatedly arranged in accordance with the above-described rule, and are thereby dispersed in the plane of the substrates with a uniform distribution density, rather than being unevenly distributed. In this way, the substrate interval keeping function due to the spacers 415 arranged in the spacer arranged portions 416 can be more stably provided. The spacer arranged portions 416, as in the fourth embodiment, have a width dimension (dimension with respect to the Y-axis direction) which is smaller than the size corresponding to the sum of a long-side dimension (dimension with respect to the Y-axis direction) of the color filters 410h (pixels PX) and a width dimension (dimension with respect to the Y-axis direction) of a pair of first partition portions 410i1 sandwiching the color filters 410h (pixels PX) with respect to the Y-axis direction. The color filters 410h adjacent to each other with respect to the X-axis direction may be displaced from each other by the difference with respect to the Y-axis direction.

To verify the superiority of a liquid crystal panel provided with the spacers 415 and the spacer arranged portions 416 having the above-described arrangement, a second comparative experiment was conducted. In the second comparative experiment, a liquid crystal panel according to example 2 was provided with the spacers 415 and the spacer arranged portions 416 described in the foregoing. A liquid crystal panel according to comparative example 3 had an arrangement of the spacers 415 and the spacer arranged portions 416 different from that of example 2. The spacer density, the opening ratio, and the rate of increase in opening ratio in example 2 and comparative example 3 were calculated, and the results are shown in FIG. 15. FIG. 15 also shows the experimental results of example 1 and comparative examples 1 and 2 in the first comparative experiment according to the fourth embodiment. In example 2 and comparative example 3, the resolution was 1058 dpi, i.e., approximately twice that in the first comparative experiment; the pixel to pixel pitch was 24 µm; and spacer non-arranged portions 417 of the first partition portions 410i1 and second partition portions 410i2 of the black matrix 410i commonly had a width of 4 µm. Thus, the color filters 410h (pixels PX) in example 2 and comparative example 3 had a short-side dimension of 4 µm, and a long-side dimension of 20 µm. In example 2 and comparative example 3, the spacers 415 had a common structure having a width dimension of 10 µm and a length dimension of 10 µm. Example 2 and comparative example 3 were also common in that the spacer arranged portions 416, in which the spacers 415 were arranged, had a size (width dimension of 20 µm, length dimension of 20 µm) obtained by adding 10 µm to each of the width dimension and the length dimension of the spacers 415.

Figure 14:
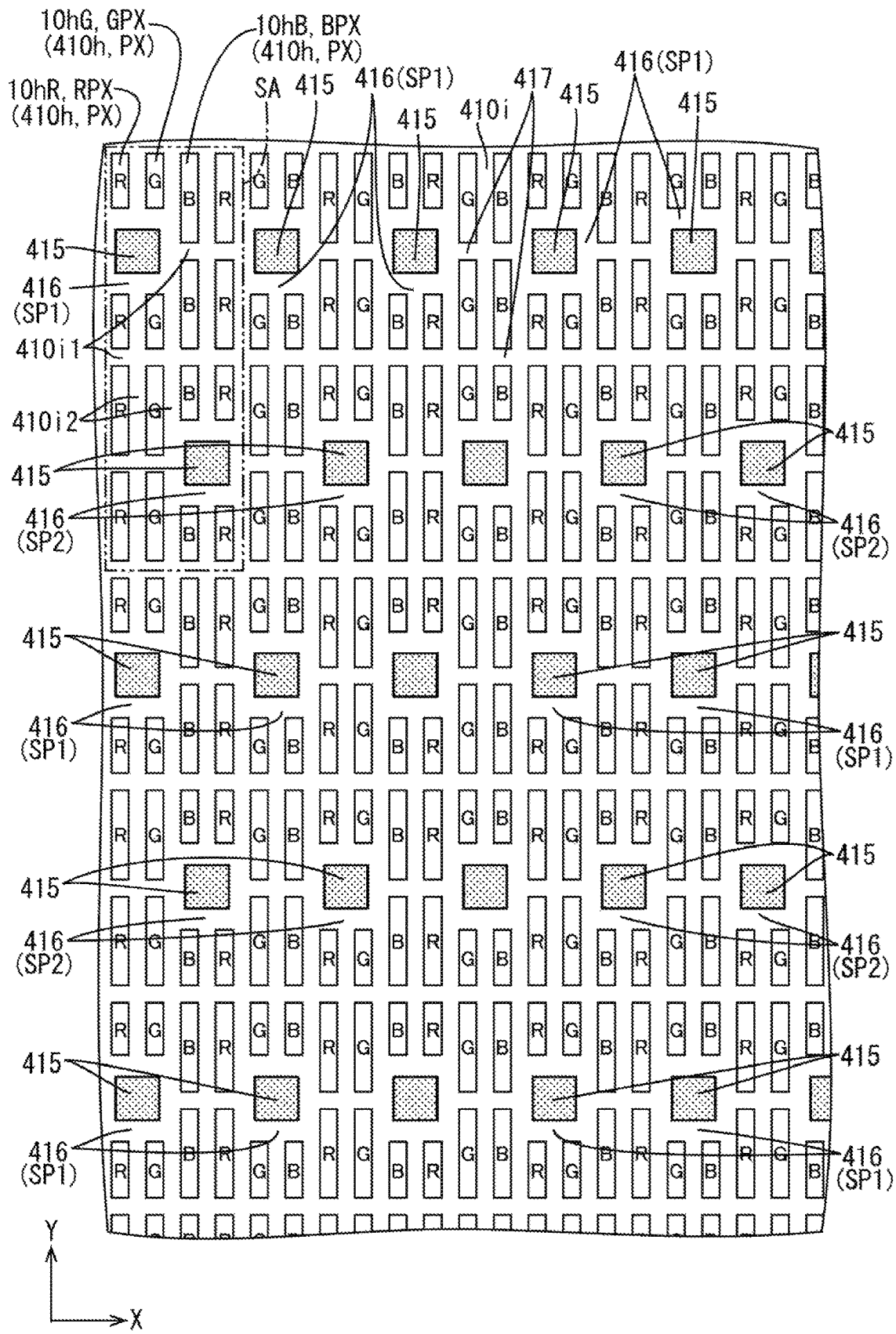
FIG. 14 is a plan view illustrating the distribution of spacers on the CF substrate according to comparative example 3 of the second comparative experiment.

As illustrated in FIG. 14, in comparative example 3, the spacers 415 and the spacer arranged portions 416 were periodically disposed at positions sandwiching four color filters 410h with respect to the Y-axis direction, and at positions sandwiching two (the same number as the number of the color filters 410h straddled by the spacers 415) color filters 410h with respect to the X-axis direction, thereby configuring two spacer arrangement patterns SP1, SP2. The spacers 415 and the spacer arranged portions 416 configuring the two spacer arrangement patterns SP1, SP2 were displaced by two (one half the number of the color filters 410h that were sandwiched with respect to the Y-axis direction) color filters 410h with respect to the Y-axis direction. That is, in comparative example 3, the spacers 415 and the spacer arranged portions 416 were distributed in a staggered arrangement similar to that of comparative examples 1 and 2 in the first comparative experiment according to the fourth embodiment. In comparative example 3, among the color filters 410h (pixels PX), those adjacent to the spacers 415 and the spacer arranged portions 416 with respect to the Y-axis direction, compared to those not adjacent thereto (dimension with respect to the Y-axis direction: 12 µm), had a smaller dimension with respect to the Y-axis direction, the difference being 8 µm. Thus, in comparative example 3, the arrangement space for the color filters 410h (pixels PX) was reduced by the arrangement space for the spacers 415 and the spacer arranged portions 416.

In FIG. 15, the "spacer density", "opening ratio", and "rate of increase in opening ratio" are as described with reference to the first comparative experiment according to the fourth embodiment. FIG. 15 indicates that, with respect to spacer density, example 2 (2.7%) was smaller than comparative example 3 (6.5%). The spacer density was greater in comparative example 3 than in comparative example 1 according to the first comparative experiment. This is because in comparative example 3, although the length dimension of the spacers 415 was decreased, resolution was further increased, resulting in a decrease in the pixel to pixel pitch and the dimensions of the color filters 410h (pixels PX), and an increase in the number of the spacers 415 installed. In example 2, the spacer density was comparable to that in example 1 in the first comparative experiment. This is due to an increase in resolution and a corresponding decrease in the pixel to pixel pitch and the dimensions of the color filters 410h (pixels PX), resulting in an increase in the number of the color filters 410h sandwiched between adjacent spacers 415. With respect to the opening ratio, example 2 (38.8%) was greater than comparative example 3 (33.3%), where the rate of increase in opening ratio calculated on the basis of the difference was approximately 17%. The rate of increase in opening ratio in the second comparative experiment was greater than the rate of increase (5%) in the first comparative experiment. Accordingly, it can be said that the higher the resolution becomes, the more efficiently the opening ratio is increased.

Sixth Embodiment

A sixth embodiment of the present invention will be described with reference to FIG. 16 to FIG. 18. In the sixth embodiment, the formation area for spacers 515 and spacer arranged portions 516 is modified from the fifth embodiment, and the number of spacer arrangement patterns SP1 to SP14 is also modified. Redundant descriptions of structures, operations, and effects similar to those of the fifth embodiment will be omitted.

Figure 16:
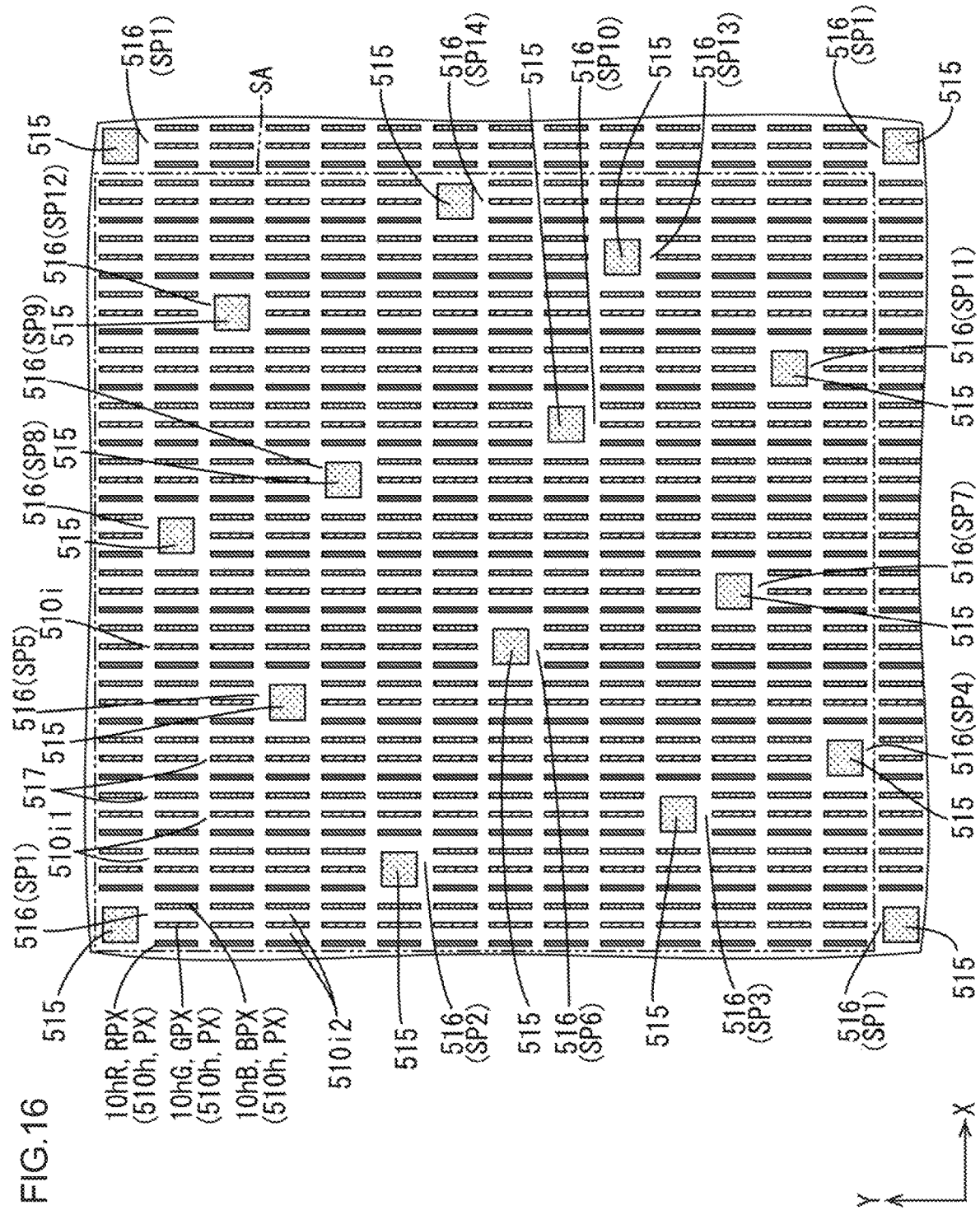
FIG. 16 is a plan view illustrating the distribution of spacers on the CF substrate according to the sixth embodiment of the present invention.

As illustrated in FIG. 16, in the present embodiment, the spacers 515 and the spacer arranged portions 516 have a formation area straddling two second partition portions 510i2 and three color filters 510h (pixels PX) with respect to the X-axis direction. That is, the dimension of the spacer arranged portions 516 with respect to the X-axis direction is greater than the corresponding dimension of one display pixel DPX (see FIG. 4). The dimension of the spacer arranged portions 516 is smaller than that described with reference to the first embodiment but is greater than that described with reference to the fourth and fifth embodiments. Specifically, the dimension of the spacer arranged portions 516 with respect to the X-axis direction is the same as the size corresponding to the sum of three ("N", a number obtained by adding one to the number of the second partition portions 510i2 that the spacer arranged portions 516 straddles with respect to the X-axis direction) times the dimension of the color filters 510h with respect to the X-axis direction, and four ("N+1") times the dimension of the second partition portions 510i2 with respect to the X-axis direction. In FIG. 16 and FIG. 17, the color filters 510h of the three colors of R, G, and B are respectively patterned differently.

As illustrated in FIG. 16, the spacer arranged portions 516 are periodically disposed at positions sandwiching 13 color filters 510h with respect to the Y-axis direction, and at positions sandwiching 39 color filters 510h with respect to the X-axis direction, thus configuring the spacer arrangement patterns SP1 to SP14. Each display pixel DPX (see FIG. 4) is configured of three pixels PX producing R, G, and B. Accordingly, the number of the pixels PX (39) sandwiched between two spacer arranged portions 516 with respect to the X-axis direction is a value obtained by multiplying the number (3) of the pixels PX configuring the display pixel DPX by the number (13) of the pixels PX sandwiched between two spacer arranged portions 516 with respect to the Y-axis direction. That is, when the number of the pixels PX configuring a single display pixel DPX is "m" (herein "m=3"), and the number of the pixels PX sandwiched between two spacer arranged portions 516 with respect to the Y-axis direction is "n" (herein "n=13"), the number of the pixels PX sandwiched between two spacer arranged portions 516 with respect to the X-axis direction is "m·n" (herein "m·n=39"), as in the first embodiment. In other words, each display pixel DPX that produces white color is configured from a total of "a·b" (herein "a·b=3") pixels PX, including "a" (herein "a=1") pixels PX arranged in the first direction and producing mutually different colors, and "b" (herein "b=3") pixels PX arranged in the second direction and producing mutually different colors. The spacer arranged portions 516 are disposed at positions sandwiching "a·n" (herein "a·n=13") pixels PX with respect to the first direction, and at positions sandwiching "b·n" (herein "b·n–39)) pixels PX with respect to the second direction.

As illustrated in FIG. 16, 14 spacer arrangement patterns SP1 to SP14 are provided such that the respective spacer arranged portions 516 are displaced with respect to the Y-axis direction. Specifically, in a spacer arrangement reference region SA (indicated by dashed and double-dotted lines in FIG. 16) in which one of the spacer arranged portions 516 configuring each of the four spacer arrangement patterns SP1 to SP14 is disposed, there are configured, in order from the leftmost spacer arranged portion 516 in the spacer arrangement reference region SA: a first spacer arrangement pattern SP1; a second spacer arrangement pattern SP2; a third spacer arrangement pattern SP3; a fourth spacer arrangement pattern SP4; a fifth spacer arrangement pattern SP5; a sixth spacer arrangement pattern SP6; a seventh spacer arrangement pattern SP1; an eighth spacer arrangement pattern SP8; a ninth spacer arrangement pattern SP9; a tenth spacer arrangement pattern SP10; an eleventh spacer arrangement pattern SP11; a twelfth spacer arrangement pattern SP12; a thirteenth spacer arrangement pattern SP13; and a fourteenth spacer arrangement pattern SP14. The spacer arranged portions 516 configuring the respective spacer arrangement patterns SP1 to SP14 are periodically repeatedly arranged in accordance with the above-described rule, and are thereby dispersed in the plane of the substrates with a uniform distribution density, rather than being unevenly distributed. In this way, the substrate interval keeping function due to the spacers 515 arranged in the spacer arranged portions 516 can be more stably provided. In addition, the spacers 515, as in the second embodiment, have a width dimension (dimension with respect to the Y-axis direction) which is substantially equal to a long-side dimension (dimension with respect to the Y-axis direction) of the color filters 510h (pixels PX). Specifically, the dimension of the spacer arranged portions 516 with respect to the Y-axis direction is the same as the size corresponding to the sum of the dimension of the color filters 510h with respect to the Y-axis direction and the dimension with respect to the Y-axis direction of a pair of first partition portions 510i1 sandwiching the color filters 510h with respect to the Y-axis direction. Accordingly, the color filters 510h adjacent to each other with respect to the X-axis direction are linearly arrayed without being displaced with respect to the Y-axis direction.

To verify the superiority of a liquid crystal panel provided with the spacers 515 and the spacer arranged portions 516 having the above-described arrangement, a third comparative experiment was conducted as described below. In the third comparative experiment, a liquid crystal panel according to example 3 was provided with the spacers 515 and the spacer arranged portions 516 that have been described above. A liquid crystal panel according to comparative example 4 had an arrangement of the spacers 515 and the spacer arranged portions 516 different from that of example 3. The spacer density, the opening ratio, the rate of increase in opening ratio in example 3 and comparative example 4 were calculated, and the results are shown in FIG. 18. FIG. 18 also shows the experimental results of examples 1 and 2 and comparative examples 1 to 3 in the first and second comparative experiments according to the fourth and fifth embodiments. Example 3 and comparative example 4 were common in that the resolution was 1588 dpi, which was approximately 1.5 times that in the second comparative experiment; the pixel to pixel pitch was 16 μm; and spacer non-arranged portions 517 of first partition portions 510i1 and second partition portions 510i2 of black matrix 510i had a width of 4 μm. Thus, in example 3 and comparative example 4, the color filters 510h (pixels PX) had a short-side dimension of 1.33 μm and a long-side dimension of 12 μm. In example 3 and comparative example 4, the spacers 515 had a common structure with a width dimension of 10 μm and a length dimension of 10 μm, which were the same as in example 2 and comparative example 3 in the second comparative experiment according to the fifth embodiment. Example 3 and comparative example 4 were also common in that the spacer arranged portions 516, in which the spacers 515 were arranged, had the size (width dimension of 20 μm, length dimension of 20 μm) obtained by adding 10 μm to each of the width dimension and the length dimension of the spacers 515.

Figure 17:
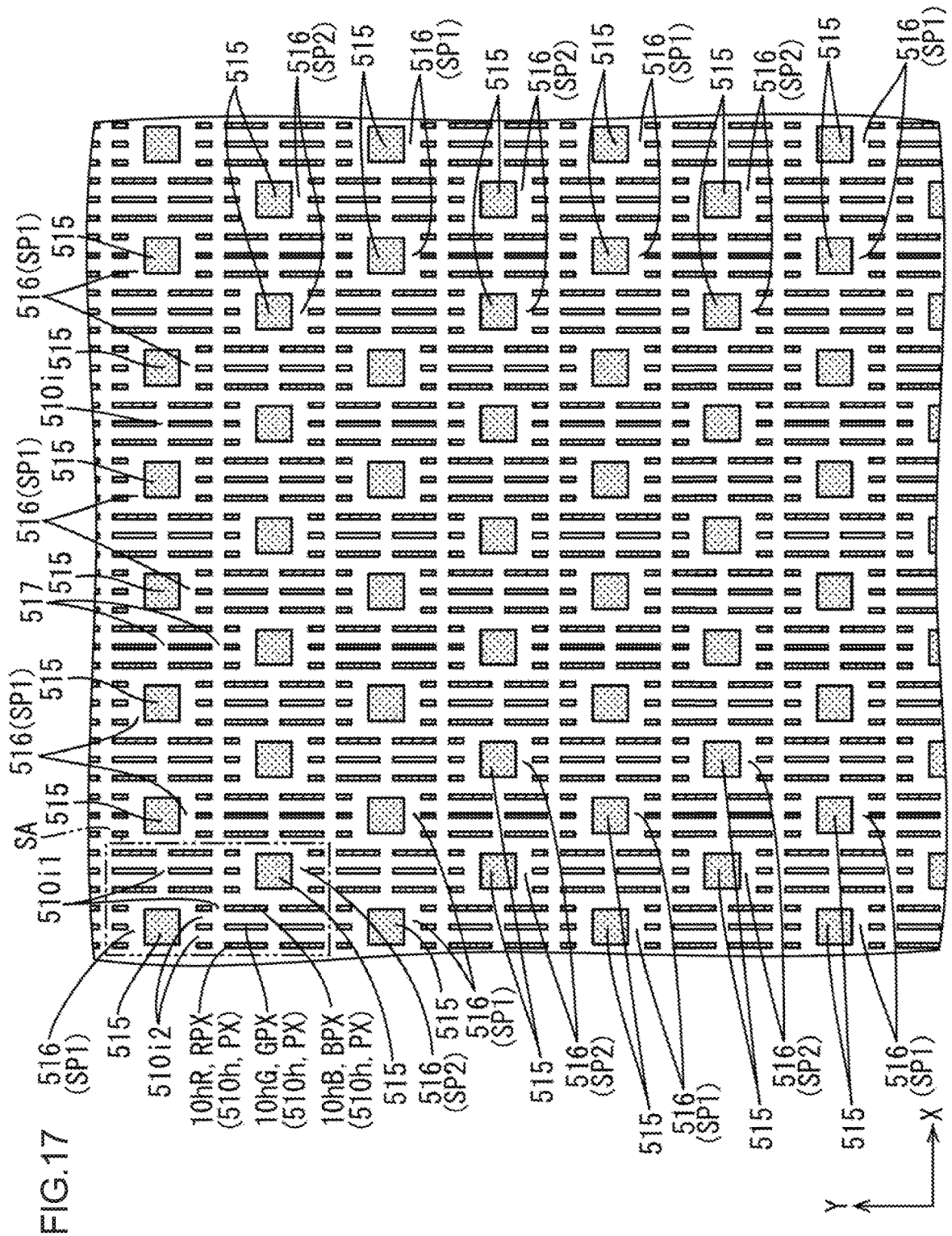
FIG. 17 is a plan view illustrating the distribution of spacers on the CF substrate according to comparative example 4 of the third comparative experiment.

As illustrated in FIG. 17, the spacers 515 and the spacer arranged portions 516 in comparative example 4 were periodically disposed at positions sandwiching four color filters 510h with respect to the Y-axis direction, and at positions sandwiching three (the same number as the number of the color filters 510h straddled by the spacers 515) color filters 510h with respect to the X-axis direction, thereby configuring two spacer arrangement patterns SP1, SP2. The spacers 515 and the spacer arranged portions 516 configuring the two spacer arrangement patterns SP1, SP2 were displaced with respect to the Y-axis direction by two (one half the number of the color filters 510h sandwiched with respect to the Y-axis direction) color filters 510h. That is, in comparative example 4, the spacers 515 and the spacer arranged portions 516 were distributed in a staggered arrangement similar to that of comparative example 3 in the second comparative experiment according to the fifth embodiment. In comparative example 4, among the color filters 510h (pixels PX), those adjacent to the spacers 515 and the spacer arranged portions 516 with respect to the Y-axis direction, compared to those not adjacent thereto (with the dimension of 4 μm with respect to the Y-axis direction), had a smaller dimension with respect to the Y-axis direction, where the difference was 8 μm. That is, in comparative example 4, the difference (8 μm) between those adjacent to the spacers 515 and the spacer arranged portions 516 and those not adjacent thereto with respect to the Y-axis direction was greater than the dimension (4 μm) of those not adjacent thereto with respect to the Y-axis direction. Thus, in comparative example 4, the arrangement space for the color filters 510h (pixels PX) was greatly reduced by the arrangement space for the spacers 515 and the spacer arranged portions 516.

In FIG. 18, the "spacer density", "opening ratio", and "rate of increase in opening ratio" are as described with reference to the first comparative experiment according to the fourth embodiment. FIG. 18 indicates that, with respect to spacer density, example 3 (2.8%) was smaller than comparative example 4 (9.8%). The spacer density of comparative example 4 was greater than that of comparative example 3 according to the second comparative experiment. This is because in comparative example 4, although the length dimension of the spacers 515 was the same as that in comparative example 3, resolution was increased, resulting in a decrease in the pixel to pixel pitch and the dimensions of the color filters 510h (pixels PX), and an increase in the number of the spacers 515 installed. In example 3, the spacer density was comparable to that in examples 1 and 2 according to the first and second comparative experiments. This is due to an increase in resolution and a corresponding decrease in the pixel to pixel pitch and the dimensions of the color filters 510h (pixels PX), resulting in an increase in the number of the color filters 510h sandwiched between adjacent spacers 515. With respect to opening ratio, example 3 (17.4%) was greater than comparative example 4 (12.5%), where the rate of increase in opening ratio calculated on the basis of the difference was approximately 39%. The rate of increase in opening ratio in the third comparative experiment was even greater than the rates of increase (5%, 17%) in the first and second comparative experiments. Accordingly, it can be said that the higher the resolution becomes, the more efficiently the opening ratio is increased.

Seventh Embodiment

A seventh embodiment of the present invention will be described with reference to FIG. 19 to FIG. 21. In the seventh embodiment, the formation area for spacers 615 and spacer arranged portions 616 is modified from the sixth embodiment, and also the number of spacer arrangement patterns SP1 to SP16 is modified. Redundant descriptions of structures, operations, and effects similar to those of the sixth embodiment will be omitted.

Figure 19:
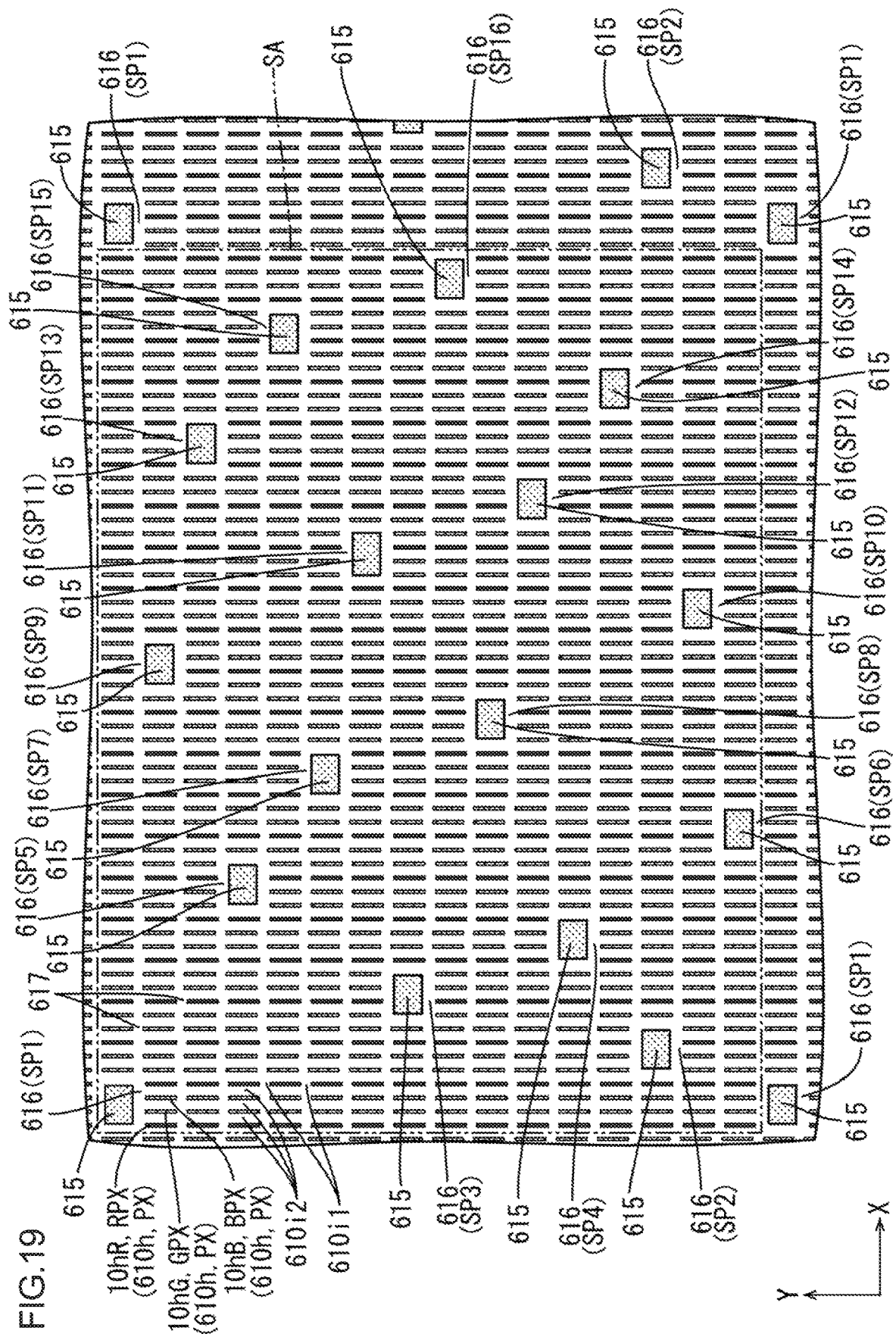
FIG. 19 is a plan view illustrating the distribution of spacers on the CF substrate according to the seventh embodiment of the present invention.

As illustrated in FIG. 19, the spacers 615 and the spacer arranged portions 616 in the present embodiment have a formation area straddling three second partition portions 610i2 and four color filters 610h (pixels PX) with respect to the X-axis direction. That is, the formation area for the spacers 615 and the spacer arranged portions 616 with respect to the X-axis direction is the same as in the first to third embodiments. In FIG. 19 and FIG. 20, the color filters 610h of the three colors of R, G, and B are patterned differently.

As illustrated in FIG. 19, the spacer arranged portions 616 are periodically disposed at positions sandwiching 15 color filters 610h with respect to the Y-axis direction, and at positions sandwiching 60 color filters 610h with respect to the X-axis direction, thereby configuring the spacer arrangement patterns SP1 to SP16. The sixteen spacer arrangement patterns SP1 to SP16 are provided such that the respective spacer arranged portions 616 are displaced with respect to the Y-axis direction. Specifically, in a spacer arrangement reference region SA (indicated by dashed and double-dotted lines in FIG. 19) in which one of the spacer arranged portions 616 configuring each of the sixteen spacer arrangement patterns SP1 to SP16 is disposed, there are configured, in order from the leftmost spacer arranged portion 616 in the spacer arrangement reference region SA: a first spacer arrangement pattern SP1; a second spacer arrangement pattern SP2; a third spacer arrangement pattern SP3; a fourth spacer arrangement pattern SP4; a fifth spacer arrangement pattern SP5; a sixth spacer arrangement pattern SP6; a seventh spacer arrangement pattern SP7; an eighth spacer arrangement pattern SP8; a ninth spacer arrangement pattern SP9; a tenth spacer arrangement pattern SP10; an eleventh spacer arrangement pattern SP11; a twelfth spacer arrangement pattern SP12; a thirteenth spacer arrangement pattern SP13; a fourteenth spacer arrangement pattern SP14; a fifteenth spacer arrangement pattern SP15; and a sixteenth spacer arrangement pattern SP16. The spacer arranged portions 616 configuring the respective spacer arrangement patterns SP1 to SP16 are periodically repeatedly arranged in accordance with the above-described rule, and are thereby dispersed in the plane of the substrates with a uniform distribution density, rather than being unevenly distributed, in this way, the substrate interval keeping function due to the arranged spacers 615 arranged in the spacer arranged portions 616 can be more stably provided. The spacer arranged portions 616, as in the third embodiment, have a width dimension (dimension with respect to the Y-axis direction) which is greater than a size corresponding to the sum of a long-side dimension (dimension with respect to the Y-axis direction) of the color filters 610h (pixels PX), and a width dimension (dimension with respect to the Y-axis direction) of a pair of first partition portions 610i1 sandwiching the color filters 610h with respect to the Y-axis direction. Thus, the color filters 610h adjacent with respect to the X-axis direction to the spacer arranged portions 616 configuring the respective spacer arrangement patterns SP1 to SP16 are displaced with respect to the Y-axis direction from the color filters 610h which are adjacent thereto with respect to the X-axis direction and which are adjacent to the spacer arranged portions 616 with respect to the Y-axis direction, where the amount of displacement is the difference between the width dimension of the spacer arranged portions 616 and the size corresponding to the sum of the long-side dimension of the color filters 610h and the width dimension of a pair of first partition portions 610i1 sandwiching the color filters 610h with respect to the Y-axis direction. In this way, the width dimension of the color filters 610h becomes constant, whereby the opening ratios of the pixels PX are made uniform. The dimension of the spacer arranged portions 616 with respect to the X-axis direction is the same as the size corresponding to the sum of four ("N", a number obtained by adding one to the number of the second partition portions 610i2 that the spacer arranged portions 616 straddle with respect to the X-axis direction) times the dimension of the color filters 610h with respect to the X-axis direction, and five ("N+1") times the dimension of the second partition portions 610i2 with respect to the X-axis direction.

To verify the superiority of a liquid crystal panel provided with the spacers 615 and the spacer arranged portions 616 having the above-described arrangement, a fourth comparative experiment was conducted. In the fourth comparative experiment, a liquid crystal panel according to example 4 was provided with the spacers 615 and the spacer arranged portions 616 that have been described above. Liquid crystal panels according to comparative examples 5, 6 were provided with the spacers 615 and the spacer arranged portions 616 in arrangements different from that of example 4. The spacer density, the opening ratio, and the rate of increase in opening ratio according to example 4 and comparative examples 5, 6 were calculated, and the results are shown in FIG. 21. FIG. 21 also shows the experimental results of examples 1 to 3 and comparative examples 1 to 4 in the first to third comparative experiments according to the fourth to sixth embodiments. Example 4 and comparative examples 5, 6 were common in that the resolution was 1693 dpi; the pixel to pixel pitch was 15 µm; and the width of spacer non-arranged portions 617 of the first partition portions 610i1 and the second partition portions 610i2 of a black matrix 610i was 4 µm. Thus, in example 4 and comparative examples 5, 6, the color filters 610h (pixels PX) had a short-side dimension of 1 µm and a long-side dimension of 11 µm. In example 4 and comparative example 5, the spacers 615 had a common structure with a width dimension of 10 µm and a length dimension of 14 µm, which were greater than those in example 3 and comparative example 4 in the third comparative experiment according to the sixth embodiment. Example 4 and comparative example 5 were also common in that the spacer arranged portions 616, in which the spacers 615 were arranged, had a size (width dimension of 20 µm, length dimension of 24 µm) obtained by adding 10 µm to each of the width dimension and the length dimension of the spacers 615.

Figure 20:
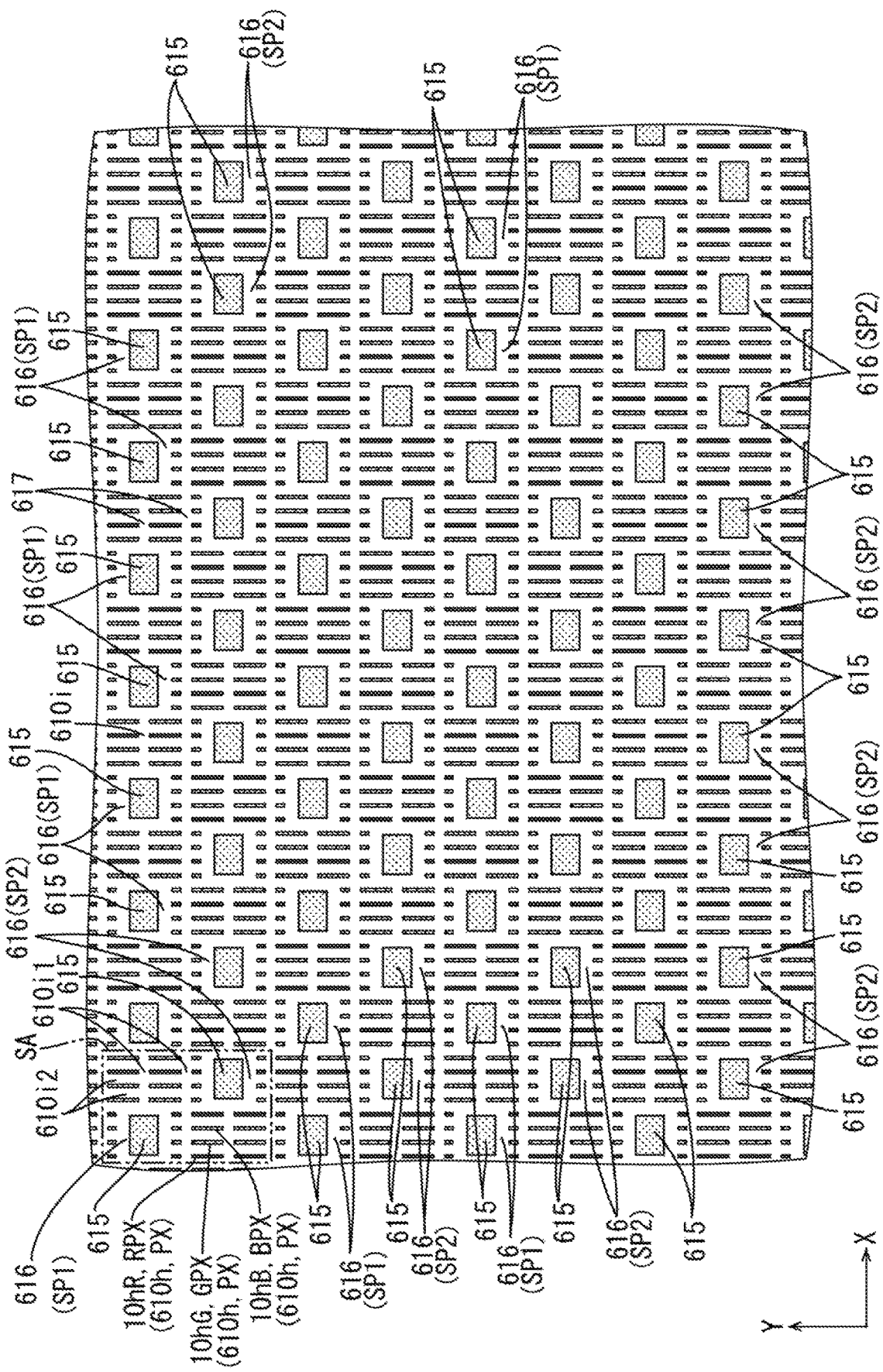
FIG. 20 is a plan view illustrating the distribution of spacers on the CF substrate according to comparative example 5 of the fourth comparative experiment.

As illustrated in FIG. 20, in comparative example 5, the spacers 615 and the spacer arranged portions 616 were periodically disposed at positions sandwiching four color filters 610h with respect to the Y-axis direction, and at positions sandwiching four (the same number as the number of the color filters 610h straddled by the spacers 615) color filters 610h with respect to the X-axis direction, thereby configuring two spacer arrangement patterns SP1, SP2. The spacers 615 and the spacer arranged portions 616 configuring the two spacer arrangement patterns SP1, SP2 were displaced with respect to the Y-axis direction by two (one half the number of the color filters 610h sandwiched with respect to the Y-axis direction) color filters 610h. That is, in comparative example 5, the spacers 615 and the spacer arranged portions 616 were distributed in a staggered arrangement similar to that of comparative examples 3, 4 in the second and third comparative experiments according to the fifth and sixth embodiments. In comparative example 5, among the color filters 610h (pixels PX), those adjacent with respect to the Y-axis direction to the spacers 615 and the spacer arranged portions 616, compared to those not adjacent thereto (with a dimension of 3 µm with respect to the Y-axis direction), had a smaller dimension with respect to the Y-axis direction, where the difference was 3 µm. That is, in comparative example 5, as in comparative example 4, the difference (8 µm) between those adjacent to the spacers 615 and the spacer arranged portions 616 with respect to the Y-axis direction and those not adjacent thereto was greater than the dimension (3 µm) of those not adjacent with respect to the Y-axis direction. Thus, in comparative example 5, the arrangement space for the spacers 615 and the spacer arranged portions 616 was further greatly reduced by the arrangement space for the color filters 610h (pixels PX). In comparative example 6, the spacers 615 and the spacer arranged portions 616 were distributed in the same way, not illustrated, as in the comparative example 5. In comparative example 6, the spacers 615 differed from those of comparative example 5 in that the width dimension was 10 µm and the length dimension was 10 µm (the length dimension being smaller by 4 µm), and the spacers 615 had the same size as those in comparative examples 3, 4, for example. In comparative example 6, the spacer arranged portions 616, in which the spacers 615 were arranged, had a width dimension and a length dimension which were of the same size (width dimension of 20 μm, length dimension of 24 μm) as that of comparative example 5, as in comparative example 2.

In FIG. 21, the "spacer density", "opening ratio", and "rate of increase in opening ratio" were as described with reference to the first comparative experiment according to the fourth embodiment. FIG. 21 indicates that, with respect to spacer density, example 4 (2.9%) was smaller than comparative examples 5, 6 (11.7%, 8.3%). Because example 4 and comparative example 5 had the same size of the spacers 615, the difference in spacer density was due to a difference in distribution of the spacers 615. Meanwhile, in comparative example 5 and comparative example 6, while the spacers 615 had the same distribution, the length dimension of the spacers 615 was different. Accordingly, the spacer density was smaller in comparative example 6 in which the size of the spacers 615 was smaller. In example 4 and comparative example 5, the spacer density was greater than in example 3 and comparative example 4 according to the third comparative experiment. This is because the difference in length dimension of the spacers 615 was greater than the difference in pixel to pixel pitch. With respect to the opening ratio, example 4 (13.7%) was greater than comparative examples 5, 6 (both 9.3%), where the rate of increase in opening ratio calculated on the basis of the difference was approximately 47%. In the fourth comparative experiment, the rate of increase in opening ratio was even greater than the rates of increase (5%, 17%, 39%) in the first to third comparative experiments. Accordingly, it can be said that the higher the resolution becomes, the more efficiently the opening ratio is increased. It is possible to adopt the spacer arrangement patterns SP1, SP2 described with reference to comparative examples 5, 6 and to not arrange the spacers 615 partly, without changing the two-dimensional size of the spacer arranged portions 616. In this way, it becomes possible to decrease the spacer density as in example 4, and to suppress or prevent the development of low-temperature bubbles. In this case, the opening ratios of the pixels PX become the same as in comparative examples 5, 6.

Other Embodiments

The present invention is not limited to the embodiments described above with reference to the drawings, and may include, for example, the following embodiments in the technical scope of the present invention.

(1) Other than as in the embodiments described above, the specific two-dimensional arrangement of the spacers and the spacer arranged portions, the number of installments (the number of the spacer arrangement patterns) per spacer arrangement reference region, the width dimension, the length dimension and the like may be modified, as appropriate.

(2) In the foregoing embodiments, the case has been indicated in which the spacers and the spacer arranged portions are arranged with certain regularity and in a dispersed manner. However, the spacers and the spacer arranged portions may be irregularly arranged in a dispersed manner. In this case, it is possible to adopt an arrangement that does not have periodicity.

(3) In the foregoing embodiments, the case has been described in which the number of the second partition portions that the spacer arranged portions straddle while extending in the X-axis direction is 1 to 3. However, the number of the second partition portions that the spacer arranged portions straddle while extending in the X-axis direction may be four or more.

(4) Other than as in the embodiments described above, the specific short-side dimension and long-side dimension of the color filters (pixels), and the width dimensions of the spacer non-arranged portions of the first partition portions and the second partition portions of the black matrix, for example, may be modified, as appropriate.

(5) Other than as in the first to third and sixth embodiments, the specific values of the natural numbers of two or more that are substituted in "m" and "n" may be modified, as appropriate, and may be "m=n", for example. Similarly, the specific values of the natural number substituted in "a" or the natural numbers of two or more substituted in "b" and "n" may be modified, as appropriate. For example, the values may be "a=b", "a=n", or "b=n".

(6) In the foregoing embodiments, the case has been indicated in which the spacers are made or a photosensitive resin material different from that of the color filters. However, a configuration may be adopted in which the spacers are made of the same material as that of the color filters. In this way, it becomes possible to form the spacers in the same step as the step of forming the color filters.

(7) In the foregoing embodiments (except for at least the first embodiment), the case has been indicated in which the pixel electrodes are disposed at the positions overlapping the spacers on the array substrate. However, the pixel electrodes may not be formed in an arrangement overlapping the spacers.

(8) In the foregoing embodiments, the configuration has been described in which the color filters (pixels) had the three colors of red, green, and blue by way of example. However, the color filters may have a four-color configuration including yellow in addition to red, green, and blue. The color filters may also have a configuration including non-colored portions that are transmissive to almost all visible light and have no wavelength selectivity, in addition to red, green, and blue.

(9) Other than as in the embodiments described above, the specific optical configuration of the head-mounted display (such as the number or arrangement of the lens portion that are used) may be modified, as appropriate.

(10) In the foregoing the embodiments, the liquid crystal panel has been described in which, by way of example, the counter electrode is disposed on the CF substrate and the operation mode is a VA mode. However, the present invention is also applicable with respect to liquid crystal panels having other operation modes, such as an in-plane switching (IPS) mode or a fringe field switching (FFS) mode.

(11) In the foregoing the embodiments, the liquid crystal panel has been described by way of example. However, the present invention is also applicable to other types of display panels (such as plasma display panels (PDF), organic EL panels, electrophoretic display (EPD) panels, and micro electro mechanical systems (MEMS) display panels).

(12) In the foregoing embodiments, a head-mounted display has been indicated. However, the present invention is also applicable to other apparatus by which an image being displayed on a liquid crystal panel is magnified and displayed using a lens and the like, such as head-up displays and projectors. The present invention is also applicable to liquid crystal display devices that do not have a magnified display function (such as television receivers, tablet-type terminals, and smartphones).

(13) In the foregoing embodiments, the configuration has been described in which the color filters that are adjacent to each other with respect to the Y-axis direction (first direction) in which the source wires extend produce the same color. However, a configuration may be adopted in which the color filters that are adjacent to each other with respect to the Y-axis direction in which the source wires extend may produce different colors. In this configuration, the pixel to pixel pitch with respect to the Y-axis direction becomes narrower than the pixel to pixel pitch with respect to the X-axis direction (second direction), and the pitch of the second partition portions becomes more gradual than that of the first partition portions. Accordingly, the spacer arranged portions may be included in the second partition portions In this configuration, preferably, the wires extending in the Y-axis direction are connected to the source electrodes of the TFTs, the wires extending in the X-axis direction are connected to the gate electrodes of the TFTs, and pixels arranged in the Y-axis direction and producing different colors are successively driven in a time-divided manner.

(14) When, as indicated above in (8), the pixels have the configuration including a color (such as yellow) other than red, green, and blue, or a non-colored portion, each display pixel may be configured of such pixels arranged in the first direction and the second direction. For example, when each display pixel is configured of four pixels, two pixels may be arranged in each of the first direction and the second direction. That is, the configuration indicated above in (5) may be such that "a=2" and "b=2". In this case, preferably, the spacer arranged portions are disposed at positions sandwiching "2n" pixels with respect to the first direction, and at positions sandwiching "2n" pixels with respect to the second direction, where n is a natural number of two or more.

EXPLANATION OF SYMBOLS 10, 110: Liquid crystal panel (Display device)
10a, 110a: CF substrate (Substrate)
10b, 110b: Array substrate (Substrate)
10i, 110i, 310i, 410i, 510i, 610i: Black matrix (Inter-pixel light blocking portion)
10i, 110i1, 210i1, 310i1, 410i1, 510i1, 610i1: First partition portion
10i2, 110i2, 310i2, 410i2, 510i2, 610i2: Second partition portion
15, 115, 215, 315, 415, 515, 615: Spacer
16, 116, 216, 316, 416, 516, 616: Spacer arranged portion
17, 117, 317, 417, 517, 617: Spacer non-arranged portion
DPX: Display pixel
EY: Eyeball (Eye)
HD: Head
HMD: Head-mounted display
HMDa: Head-mounted unit
PX: Pixel
RE: Lens portion
SP1 to SP16: Spacer arrangement pattern

The invention claimed is:

1. A display device comprising:
a pair of substrates bonded to each other;
a plurality of pixels arranged in each of a first direction and a second direction perpendicular to each other in a plane of the substrates;
an inter-pixel light blocking portion which includes at least one first partition portion partitioning the pixels arranged in the first direction and at least one second partition portion partitioning the pixels arranged in the second direction, and which blocks light between adjacent pixels;
a spacer disposed between the pair of substrates;
a spacer non-arranged portion which is included in the first partition portion and in which the spacer is not arranged; and
a spacer arranged portion which is included in the first partition portion and in which the spacer is arranged, wherein:
the spacer arranged portion has a formation area straddling the second partition portion with respect to the second direction, and is wider than the spacer non-arranged portion;
the spacer arranged portion has a dimension with respect to the first direction which is smaller than a size corresponding to a sum of a dimension of the pixels with respect to the first direction, and a dimension with respect to the first direction of a pair of the first partition portions sandwiching the pixels with respect to the first direction;
among the plurality of pixels, the pixel which is adjacent with respect to the second direction to the spacer arranged portion having the spacer arranged therein is displaced by an amount with respect to the first direction from the pixel which is adjacent thereto with respect to the second direction and which is adjacent to the spacer arranged portion with respect to the first direction; and
the amount of displacement is a difference in width between the spacer arranged portion and the spacer non-arranged portion.

2. The display device according to claim 1, wherein
the at least one first partition portion in the inter-pixel light blocking portion includes a plurality of first partition portions partitioning the pixels arranged in the first direction and the at least one second partition portion includes a plurality of second partition portions partitioning the pixels arranged in the second direction, and
the display device further comprises three or more spacer arranged portions disposed at positions sandwiching the plurality of pixels with respect to each of the first direction and the second direction.

3. The display device according to claim 2, wherein the spacer arranged portions are periodically disposed at positions sandwiching a certain number of the pixels with respect to each of the first direction and the second direction so as to configure a spacer arrangement pattern.

4. The display device according to claim 3, further comprising a plurality of the spacer arrangement patterns such that the respective spacer arranged portions are displaced with respect to the first direction.

5. The display device according to claim 2, wherein
the pixels include a plurality of pixels which are arranged in at least one of the first direction and the second direction, and which produce mutually different colors, the plurality of pixels configuring a single display pixel which produces white color, and
the spacer arranged portions are disposed at positions sandwiching a same number of the display pixels with respect to each of the first direction and the second direction.

6. The display device according to claim 5, wherein the spacer arranged portion has a dimension with respect to the second direction which is the same as a size corresponding to the sum of "N" times a dimension of the pixels with respect to the second direction and "N+1" times a dimension of the second partition portion with respect to the second direction.

7. A display device comprising:

a pair of substrates bonded to each other;

a plurality of pixels arranged in each of a first direction and a second direction perpendicular to each other in a plane of the substrates;

an inter-pixel light blocking portion which includes at least one first partition portion partitioning the pixels arranged in the first direction and at least one second partition portion partitioning the pixels arranged in the second direction, and which blocks light between adjacent pixels;

a spacer disposed between the pair of substrates;

a spacer non-arranged portion which is included in the first partition portion and in which the spacer is not arranged; and a spacer arranged portion which is included in the first partition portion and in which the spacer is arranged, wherein:

the spacer arranged portion has a formation area straddling the second partition portion with respect to the second direction, and is wider than the spacer non-arranged portion;

the spacer arranged portion has a dimension with respect to the first direction which is equal to or greater than a size corresponding to the sum of a dimension of the pixels with respect to the first direction and a dimension with respect to the first direction of a pair of the first partition portions sandwiching the pixels with respect to the first direction;

the dimension of the spacer arranged portion with respect to the first direction is greater than the size corresponding to the sum of the dimension of the pixels with respect to the first direction and the dimension with respect to the first direction of the pair of the first partition portions sandwiching the pixels with respect to the first direction;

among the plurality of pixels, the pixels which are adjacent with respect to the second direction to the spacer arranged portion having the spacer arranged therein is displaced by an amount with respect to the first direction from the pixels which are adjacent thereto with respect to the second direction and which are adjacent with respect to the first direction to the spacer arranged portion with respect to the first direction; and the amount of displacement is a difference between the dimension of the spacer arranged portion with respect to the first direction and the size corresponding to the sum of the dimension of the pixels with respect to the first direction and the dimension with respect to the first direction of the pair of the first partition portions sandwiching the pixels with respect to the first direction.

8. A head-mounted display comprising at least:

the display device according to claim 7;

a lens portion imaging an image displayed on the display device onto an eye of a user; and a head-mounted unit which includes the display device and the lens portion and which is worn on a head of the user.

* * * * *